United States Patent
Kambayashi et al.

(10) Patent No.: US 11,114,729 B2
(45) Date of Patent: Sep. 7, 2021

(54) ENERGY STORAGE DEVICE AND METHOD OF MANUFACTURING ENERGY STORAGE DEVICE

(71) Applicant: GS Yuasa International Ltd., Kyoto (JP)

(72) Inventors: Hirokazu Kambayashi, Kyoto (JP); Kazuto Maeda, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 259 days.

(21) Appl. No.: 15/761,464

(22) PCT Filed: Sep. 27, 2016

(86) PCT No.: PCT/JP2016/078384
§ 371 (c)(1),
(2) Date: Mar. 20, 2018

(87) PCT Pub. No.: WO2017/057324
PCT Pub. Date: Apr. 6, 2017

(65) Prior Publication Data
US 2018/0342723 A1 Nov. 29, 2018

(30) Foreign Application Priority Data

Sep. 29, 2015 (JP) .............................. JP2015-192253

(51) Int. Cl.
*H01M 50/531* (2021.01)
*H01G 11/72* (2013.01)
(Continued)

(52) U.S. Cl.
CPC .......... *H01M 50/531* (2021.01); *H01G 9/008* (2013.01); *H01G 9/0029* (2013.01);
(Continued)

(58) Field of Classification Search
CPC ........ H01G 11/10; H01G 11/72; H01G 11/76; H01G 11/80; H01G 11/82; H01G 9/0029;
(Continued)

(56) References Cited

U.S. PATENT DOCUMENTS

2006/0115722 A1* 6/2006 Kim ...................... H01M 2/263
429/161
2006/0238960 A1* 10/2006 Poplett ................... H01G 9/004
361/512
(Continued)

FOREIGN PATENT DOCUMENTS

JP 2001-338632 A 12/2001
JP 2003-197174 A 7/2003
(Continued)

OTHER PUBLICATIONS

International Search Report (ISR) (PCT Form PCT/ISA/210), in PCT/JP2016/078384, dated Dec. 20, 2016.

*Primary Examiner* — Adam A Arciero
(74) *Attorney, Agent, or Firm* — McGinn I.P. Law Group, PLLC.

(57) ABSTRACT

An energy storage device including: an electrode assembly and a positive electrode current collector, wherein the positive electrode current collector includes an electrode connecting portion connected to the electrode assembly, the electrode connecting portion includes a first portion and a second portion which has a smaller wall thickness than the first portion and is joined to the electrode assembly, and either one of the second portion or the electrode assembly includes a first convex portion projecting toward the other in a joined portion.

20 Claims, 12 Drawing Sheets

(51) Int. Cl.
*H01G 11/82* (2013.01)
*H01G 11/80* (2013.01)
*H01G 11/76* (2013.01)
*H01G 11/10* (2013.01)
*H01M 50/528* (2021.01)
*H01G 9/00* (2006.01)
*H01G 9/008* (2006.01)
*H01G 9/04* (2006.01)
*H01M 10/0525* (2010.01)
*H01M 50/538* (2021.01)

(52) U.S. Cl.
CPC ............... *H01G 9/04* (2013.01); *H01G 11/10* (2013.01); *H01G 11/72* (2013.01); *H01G 11/76* (2013.01); *H01G 11/80* (2013.01); *H01G 11/82* (2013.01); *H01M 50/528* (2021.01); *H01M 10/0525* (2013.01); *H01M 50/538* (2021.01)

(58) Field of Classification Search
CPC ..... H01G 9/008; H01G 9/04; H01M 10/0525; H01M 2/22; H01M 2/26; H01M 2/263
See application file for complete search history.

(56) References Cited

U.S. PATENT DOCUMENTS

| | | | | |
|---|---|---|---|---|
| 2007/0092791 | A1* | 4/2007 | Hayashi | H01M 2/266 429/161 |
| 2012/0015240 | A1* | 1/2012 | Baek | H01M 2/021 429/178 |
| 2013/0209849 | A1* | 8/2013 | Hattori | H01M 2/26 429/94 |
| 2017/0179533 | A1 | 6/2017 | Suzuki et al. | |

FOREIGN PATENT DOCUMENTS

| | | |
|---|---|---|
| JP | 2004-273178 A | 9/2004 |
| JP | 2005-267945 A | 9/2005 |
| JP | 4374870 B2 | 12/2009 |
| JP | 2011-165436 A | 8/2011 |
| JP | 2012-169064 A | 9/2012 |
| JP | 2013-020731 A | 1/2013 |
| JP | 2015-005456 A | 1/2015 |
| JP | 2015-050151 A | 3/2015 |
| JP | 2015-115328 A | 6/2015 |
| JP | 2015-232977 A | 12/2015 |
| WO | WO 2012/057335 A1 | 5/2012 |

* cited by examiner

US 11,114,729 B2

ENERGY STORAGE DEVICE AND METHOD OF MANUFACTURING ENERGY STORAGE DEVICE

TECHNICAL FIELD

The present invention relates to an energy storage device provided with an electrode assembly and current collectors and a method of manufacturing the energy storage device.

BACKGROUND ART

There has been widely known an energy storage device including an electrode assembly and current collectors which are joined to each other. Conventionally, with respect to such an energy storage device, there has been proposed the configuration where a current collector is embedded into an electrode assembly for firmly joining the electrode assembly and the current collector to each other (see patent document 1, for example).

PRIOR ART DOCUMENTS

Patent Documents

Patent Document 1: JP-A-2004-273178

SUMMARY OF THE INVENTION

Problems to be Solved by the Invention

However, when the electrode assembly and the current collector are firmly joined to each other by embedding the current collector into the electrode assembly as in the above-mentioned conventional energy storage device, there exists a drawback that performance of the energy storage device may be lowered.

The present invention has been made in view of the above-mentioned drawbacks, and it is an object of the present invention to provide an energy storage device which can suppress lowering of performance of the energy storage device while firmly joining the electrode assembly and the current collector to each other.

Means for Solving the Problems

To achieve the above-mentioned object, an energy storage device according to an aspect of the present invention includes an electrode assembly and a current collector. The current collector includes an electrode connecting portion connected to the electrode assembly. The electrode connecting portion includes a first portion and a second portion which has a smaller wall thickness than the first portion and is joined to the electrode assembly. Either one of the second portion or the electrode assembly includes a first convex portion projecting toward another of the second portion and the electrode assembly in a joined portion.

Advantages of the Invention

According to the energy storage device of the present invention, lowering of performance of the energy storage device can be suppressed while firmly joining the electrode assembly and the current collector to each other.

MODE FOR CARRYING OUT THE INVENTION

Figure 1:
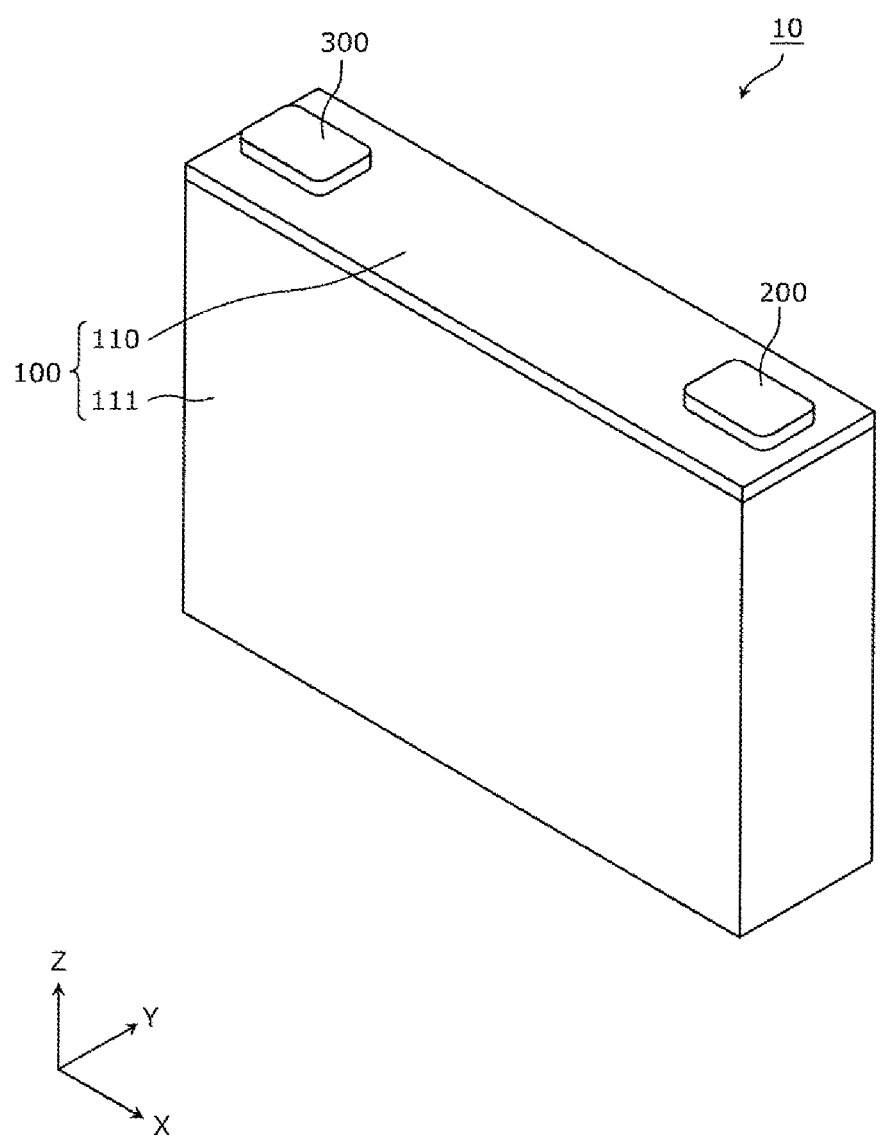
FIG. 1 is a perspective view schematically showing an external appearance of an energy storage device according to an embodiment of the present invention.

When the electrode assembly and the current collector are firmly joined to each other by embedding the current collector into the electrode assembly as in the above-mentioned conventional energy storage device, there exists a drawback that performance of the energy storage device may be lowered.

That is, in the conventional energy storage device, in joining the electrode assembly and the current collector to each other, a large force is necessary for embedding the current collector into the electrode assembly and hence, it is necessary to use a large joining tool. The electrode assembly is joined to the current collector at a portion where an active material is not applied (an active material non-applied portion). In arranging a large joining tool on the active material non-applied portion, there may be a case where it is necessary to make the active material non-applied portion large. Since the active material non-applied portion is a portion which does not contribute to the generation of power in the electrode assembly, when the active material non-applied portion is made large, energy density of the energy storage device is lowered so that performance of the energy storage device is lowered.

The present invention has been made in view of the above-mentioned drawbacks, and it is an object of the present invention to provide an energy storage device which can suppress lowering of performance of the energy storage device while firmly joining the electrode assembly and the current collector to each other.

To achieve the above-mentioned object, an energy storage device according to an aspect of the present invention includes an electrode assembly and a current collector, wherein the current collector includes an electrode connecting portion connected to the electrode assembly. The electrode connecting portion includes a first portion and a second portion which has a smaller wall thickness than the first portion and is joined to the electrode assembly. Either one of the second portion or the electrode assembly includes a first convex portion projecting toward the other of the second portion and the electrode assembly in a joined portion.

With such a configuration, in the energy storage device, either one of the second portion of the current collector or the electrode assembly includes the first convex portion projecting toward the other in the joined portion. That is, either one of the second portion of the current collector or the electrode assembly forms the first convex portion and bites into the other and hence, the current collector and the electrode assembly are firmly joined to each other. In with such a configuration, the second portion is a portion having a smaller wall thickness than the first portion and hence, the first convex portion can be formed and the current collector and the electrode assembly can be joined to each other with a small amount of force. Accordingly, a small joining tool can be used and hence, an active material non-applied portion of the electrode assembly (a width of the active material non-applied portion is narrowed) can be made small whereby lowering of energy density of the energy storage device can be suppressed. In this manner, according to the energy storage device, lowering of performance of the energy storage device can be suppressed while firmly joining the electrode assembly and the current collector to each other by forming the first convex portion. Further, the first portion of the current collector has a larger thickness than the second portion of the current collector and hence, lowering of a strength of the current collector at the second portion can be suppressed by the first portion whereby lowering of performance of the energy storage device can be suppressed.

The current collector may further include a terminal connecting portion connected to an electrode terminal, and at least a portion of the first portion may be disposed between the terminal connecting portion and the second portion.

With such a configuration, in the current collector, at least the portion of the first portion is disposed between the terminal connecting portion connected to the electrode terminal and the second portion joined to the electrode assembly. That is, the portion having a large thickness is disposed between the terminal connecting portion and the second portion and hence, a strength between the terminal connecting portion and the second portion can be ensured whereby lowering of performance of the energy storage device can be suppressed.

The electrode connecting portion may include a plurality of the second portions, and at least a portion of the first portion may be disposed between the plurality of second portions.

With such a configuration, in the current collector, at least a portion of the first portion is disposed between the plurality of second portions. That is, the portion having a large thickness is disposed between the second portions having a small thickness and hence, a strength between the plurality of second portions can be ensured whereby lowering of performance of the energy storage device can be suppressed.

At least a portion of the first portion may be disposed on a periphery of the second portion.

With such a configuration, in the current collector, at least a portion of the first portion is disposed on the periphery of the second portion. That is, the portion having a large thickness is disposed around the second portion having a small thickness and hence, a strength of the periphery of the second portion can be ensured whereby lowering of performance of the energy storage device can be suppressed.

The energy storage device may further include a cover member disposed at a position where the cover member sandwiches the electrode assembly in cooperation with the electrode connecting portion, and the cover member may include a first cover portion and a second cover portion which has a smaller wall thickness than the first cover portion and is joined to the electrode assembly.

With such a configuration, also the cover member is joined to electrode assembly at the second cover portion having a small thickness and hence, the current collector and the cover member can be joined to the electrode assembly with a smaller force. Accordingly, a smaller joining tool can be used and hence, lowering of performance of the energy storage device can be further suppressed.

Further, to achieve the above-mentioned object, a method of manufacturing an energy storage device according to another aspect of the present invention is a method of manufacturing an energy storage device which includes an electrode assembly and a current collector including an electrode connecting portion connected to the electrode assembly. A thin wall thickness portion having a smaller wall thickness than other portions is formed on the electrode connecting portion, and the thin wall thickness portion and the electrode assembly are joined to each other by plastic deformation.

With such a configuration, in the method of manufacturing an energy storage device, the thin wall thickness portion having a smaller wall thickness than other portions is formed on the electrode connecting portion of the current collector, and the thin wall thickness portion and the electrode assembly are joined to each other by plastic deformation. That is, by joining the current collector and the electrode assembly to each other at the thin wall thickness portion, the current collector and the electrode assembly can be joined to each other by plastic deformation with a small amount of force. Accordingly, a small joining tool can be used and hence, an active material non-applied portion of the electrode assembly (a width of the active material non-applied portion can be narrowed) can be made small whereby lowering of the performance of the energy storage device can be suppressed. Further, an other portion of the current collector except for the thin wall thickness portion has a large thickness and hence, lowering of a strength of the current collector at the thin wall thickness portion can be suppressed by such other portions whereby lowering of performance of the energy storage device can be suppressed.

Hereinafter, an energy storage device according to an embodiment of the present invention is described with reference to drawings. The embodiment described hereinafter is one preferred specific example of the present invention. In the embodiment described hereinafter, numerical values, shapes, materials, constitutional elements, the arrangement positions and connection states of the constitutional elements, manufacturing steps, the order of manufacturing steps and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

Embodiment

First, the configuration of an energy storage device 10 is described.

Figure 2:
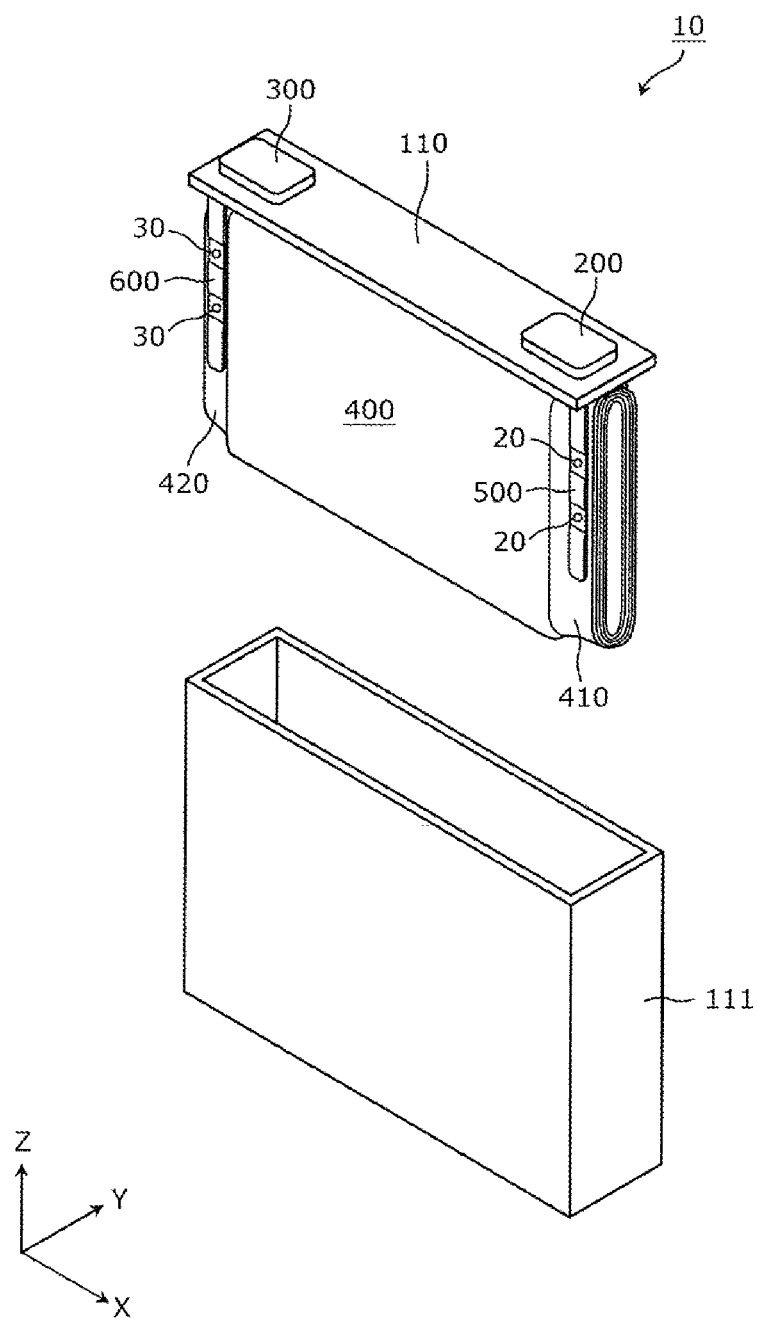
FIG. 2 is a perspective view showing constitutional elements disposed in the inside of a container of the energy storage device according to the embodiment of the present invention.

FIG. 1 is a perspective view schematically showing an external appearance of the energy storage device 10 according to an embodiment of the present invention. Further, FIG. 2 is a perspective view showing constitutional elements disposed in the inside of a container 100 of the energy storage device 10 according to the embodiment of the present invention. To be more specific, FIG. 2 is a perspective view showing the configuration where a container body 111 is removed from the energy storage device 10. That is, FIG. 2 shows a state after a positive electrode current collector 500 and a negative electrode current collector 600 are joined to an electrode assembly 400.

Figure 3:
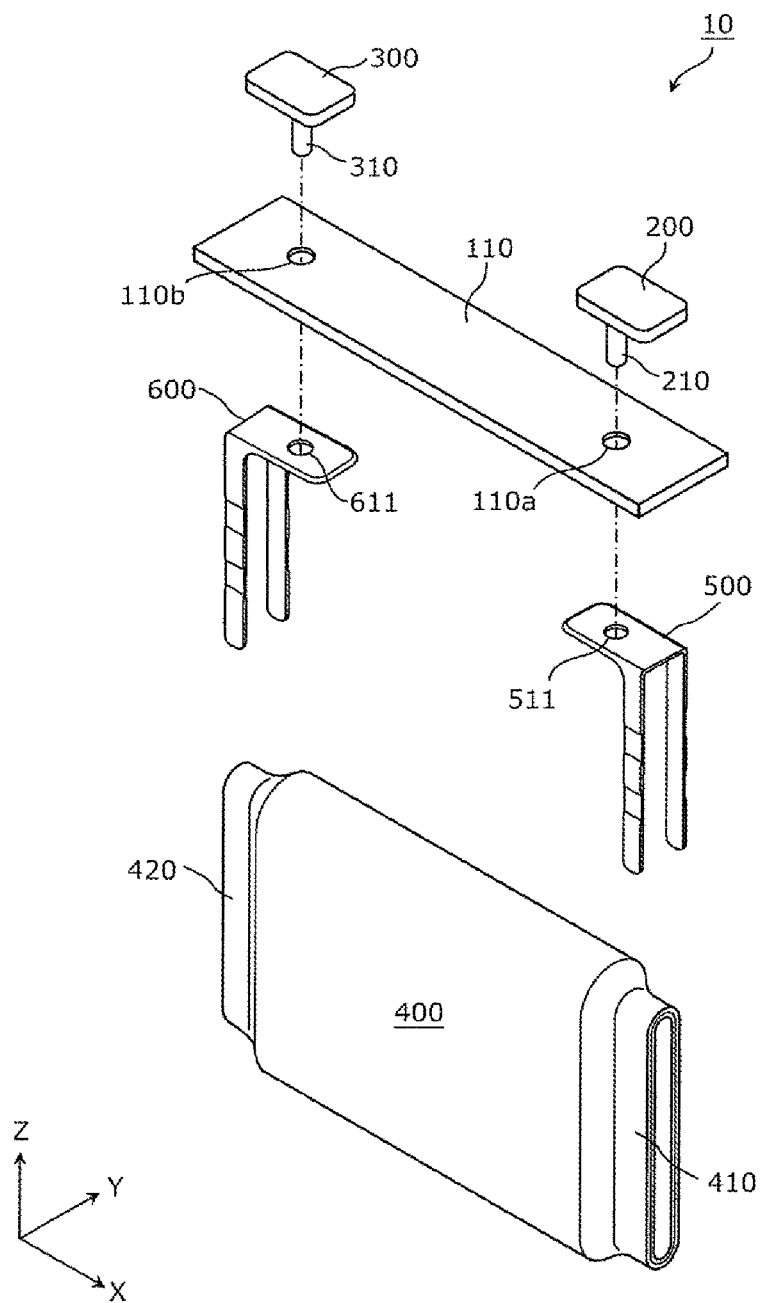
FIG. 3 is an exploded perspective view showing the respective constitutional elements when the energy storage device according to the embodiment of the present invention is disassembled.

FIG. 3 is an exploded perspective view showing the respective constitutional elements when the energy storage device 10 according to the embodiment of the present invention is disassembled. That is, FIG. 3 shows a state before the positive electrode current collector 500 and the negative electrode current collector 600 are joined to the electrode assembly 400. FIG. 3 shows the configuration where the container body 111 is omitted.

In these drawings, the Z axis direction is indicated as the vertical direction, and the description is made hereinafter using the Z axis direction as the vertical direction. However, there may be also a case where the Z axis direction is not the vertical direction depending on a mode of use and hence, the Z axis direction is not limited to the vertical direction. The same goes also for drawings which are referenced hereinafter.

The energy storage device 10 is a secondary battery which can charge electricity or discharge electricity. To be more specific, the energy storage device 10 is a nonaqueous electrolyte secondary battery such as a lithium ion secondary battery. For example, the energy storage device 10 is applicable to a power source for an automobile such as an electric vehicle (EV), a hybrid electric vehicle (HEV), a plug-in hybrid electric vehicle (PHEV) or the like, a power source for electronic equipment, a power source for energy storage and the like.

The energy storage device 10 is not limited to a nonaqueous electrolyte secondary battery, and may be a secondary battery other than a nonaqueous electrolyte secondary battery, or may be a capacitor. Further, the energy storage device 10 may be a primary battery with which a user can use stored electricity without charging. In this embodiment, although the energy storage device 10 having a rectangular shape (prismatic shape) is shown, the shape of the energy storage device 10 is not limited to a rectangular shape, and may have a circular columnar shape, an elongated circular columnar shape, or the like, and a laminated-type energy storage device may be used as the energy storage device 10.

As shown in FIG. 1, the energy storage device 10 includes the container 100, a positive electrode terminal 200, and a negative electrode terminal 300. Further, as shown in FIG. 2, the electrode assembly 400, the positive electrode current collector 500, and the negative electrode current collector 600 are accommodated in the inside of the container 100.

Besides the above-mentioned constitutional elements, spacers respectively disposed on a side of the positive electrode current collector 500 and a side of the negative electrode current collector 600, a gas release valve for releasing a pressure when a pressure in the inside of the container 100 is increased, an insulation film for enveloping the electrode assembly 400 and the like may be also disposed. A liquid such as an electrolyte solution (nonaqueous electrolyte) is sealed in the container 100. However, the illustration of such a liquid is omitted. As such an electrolyte solution, a kind of the electrolyte solution is not particularly limited and any kind of electrolyte solution can be selected from various kinds of electrolyte solutions provided that performance of the energy storage device 10 is not impaired.

The container 100 is formed of; a bottomed container body 111 having a rectangular cylindrical shape; and a lid body 110 which is a plate-like member which closes an opening of the container body 111. The container 100 is configured such that the inside of the container 100 can be hermetically sealed by joining the lid body 110 and the container body 111 to each other by welding or the like after the electrode assembly 400 and the like are accommodated in the inside of the container 100. Although a material for forming the lid body 110 and the container body 111 is not particularly limited, for example, weldable metal such as stainless steel, aluminum or an aluminum alloy can be used and, further, a resin can be also used.

The electrode assembly 400 is an energy storage element which includes a positive electrode, a negative electrode, and a separator, and can store electricity. The positive electrode is formed by forming a positive active material layer on a positive electrode substrate layer which is formed of an elongated strip-shaped current collecting foil made of aluminum, an aluminum alloy or the like. The negative electrode is formed by forming a negative active material layer on a negative electrode substrate layer which is an elongated strip-shaped current collecting foil made of copper, a copper alloy or the like. As the separator, a microporous sheet made of a resin or a non-woven fabric can be used. As the above-mentioned current collecting foil, a known material such as nickel, iron, stainless steel, titanium, calcinated carbon, a conductive polymer, conductive glass, an Al—Cd alloy or the like can be also suitably used.

The electrode assembly 400 is formed by winding a member which is formed where the positive electrode, the negative electrode and the separator are disposed in a layered manner such that the separator is sandwiched between the positive electrode and the negative electrode. To be more specific, the electrode assembly 400 is formed such that the positive electrode and the negative electrode are wound with the separator sandwiched therebetween in a state where the positive electrode and the negative electrode are displaced from each other in a winding axis (an imaginary axis parallel to the X axis direction in this embodiment) direction. Further, the positive electrode and the negative electrode respectively have a portion where an active material is not applied by coating (an active material layer is not formed) so that the substrate layer is exposed (active material non-coating portion) on end edge portions thereof in a direction that the positive electrode and the negative electrode are displaced from each other.

The electrode assembly 400 has a positive electrode converged portion 410 which is formed by stacking and converging the active material non-applied portions of the positive electrode on one end portion in the winding axis direction (an end portion on a plus side in the X axis direction). Further, the electrode assembly 400 has, a negative electrode converged portion 420 which is formed by stacking and converging the active material non-applied portions of the negative electrode on the other end portion in the winding axis direction (an end portion on a minus side in the X axis direction). For example, thicknesses of the active material non-applied portions (current collecting foils) of the positive electrode and the negative electrode are set to approximately 5 μm to 20 μm, and the positive electrode converged portion 410 and the negative electrode converged portion 420 are formed by stacking thirty to forty active material non-applied portions (current collecting foils).

As a positive active material used for forming the positive active material layer, a known material can be suitably used provided that the positive active material is made of a material which can occlude and discharge lithium ions. For example, the positive active material used for forming the positive active material layer may be selected from a group consisting of a composite oxide expressed by $Li_xMO_y$, (M indicating at least one kind of transition metal) ($Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$, $Li_xNi_yMn_{(2-y)}O_4$ or the like), or a polyanion compound expressed by $Li_wMe_x(XO_y)_z$ (Me indicating at least one kind of transition metal, X being P, Si, B, V or the like, for example) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$ or the like). An element or a polyanion in these compounds may be partially replaced with other element or other anion species. Further, disulfide polypyrrole, polyaniline, polyparastyrene, polyacetylene, a conductive polymer compound such as polyacene-based material, a carbonaceous material having a pseudo graphite structure or the like can be named. However, the positive active material is not limited to these materials. In these materials, one kind of material may be used singly, or two or more kinds of materials may be used in arbitrary combination and at an arbitrary ratio.

As the negative active material used for forming the negative active material layer, a known material can be suitably used provided that the negative active material is made of a material which can occlude and discharge lithium ions. For example, besides lithium metal, and a lithium alloy (lithium-aluminum, lithium-lead, lithium-tin, lithium-aluminum-tin, lithium-gallium, and a lithium metal containing alloy such as a Wood alloy), an alloy which can occlude and discharge lithium, a carbon material (for example, graphite, hardly graphitizable carbon, easily graphitizable carbon, low-temperature calcinated carbon, amorphous carbon or the like), metal oxide, lithium metal oxide ($Li_4Ti_5O_{12}$ or the like), and a polyphosphoric acid compound or the like can be named. In these materials, only one kind of material may be used, or two or more kinds of materials may be used in arbitrary combination and at arbitrary ratios.

In this embodiment, although the electrode assembly 400 formed in an elongated circular shape in cross section is shown in the drawing, the electrode assembly 400 may have a circular shape or an elliptical shape in cross section. Further, the electrode assembly 400 is not limited to a winding-type electrode assembly, and may be formed by stacking flat-plate-like plates, or may be formed by folding a plate in a bellows shape.

The positive electrode terminal 200 is an electrode terminal which is electrically connected to the positive electrode of the electrode assembly 400, and the negative electrode terminal 300 is an electrode terminal which is electrically connected to the negative electrode of the electrode assembly 400. That is, the positive electrode terminal 200 and the negative electrode terminal 300 are metal-made electrode terminals through which electricity stored in the electrode assembly 400 is discharged to a space outside the energy storage device 10 and through which electricity is introduced into a space inside the energy storage device 10 for storing the electricity in the electrode assembly 400.

The positive electrode terminal 200 and the negative electrode terminal 300 are mounted on the lid body 110 disposed above the electrode assembly 400. To be more specific, as shown in FIG. 3, the positive electrode terminal 200 is fixed to the lid body 110 together with the positive electrode current collector 500 by inserting a projecting portion 210 of the positive electrode terminal 200 into a through hole 110a formed in the lid body 110 and an opening portion 511 formed in the positive electrode current collector 500 and by swaging the projecting portion 210. In the same manner, the negative electrode terminal 300 is fixed to the lid body 110 together with the negative electrode current collector 600 by inserting a projecting portion 310 of the negative electrode terminal 300 into a through hole 110b formed in the lid body 110 and an opening portion 611 formed in the negative electrode current collector 600 and by swaging the projecting portion 310.

Although a gasket and the like are disposed between the lid body 110 and the positive electrode terminal 200 and between the lid body 110 and the positive electrode current collector 500 for enhancing insulation property and airtightness, in the drawings, the illustration of the gasket and the like is omitted. The same goes also for the configuration on a negative electrode side.

The positive electrode current collector 500 is a member having conductivity and rigidity which is disposed between the positive electrode converged portion 410 of the electrode assembly 400 and a side wall of the container body 111, and is electrically connected to the positive electrode terminal 200 and the positive electrode of the electrode assembly 400. Further, the negative electrode current collector 600 is a member having conductivity and rigidity which is disposed between the negative electrode converged portion 420 of the electrode assembly 400 and a side wall of the container body 111, and is electrically connected to the negative electrode terminal 300 and the negative electrode of the electrode assembly 400.

To be more specific, the positive electrode current collector 500 and the negative electrode current collector 600 are respectively formed of a plate-like conductive member which is disposed in a bent state along the side wall and the lid body 110 from the side wall of the container body 111 to the lid body 110. The positive electrode current collector 500 and the negative electrode current collector 600 are fixedly connected (joined) to the lid body 110. The positive electrode current collector 500 and the negative electrode current collector 600 are fixedly connected (joined) to the positive electrode converged portion 410 and the negative electrode converged portion 420 of the electrode assembly 400 respectively. With such a configuration, the electrode assembly 400 is held (supported) in a state where the electrode assembly 400 is suspended from the lid body 110 by way of the positive electrode current collector 500 and the negative electrode current collector 600 thus suppressing tilting of the electrode assembly 400 caused by vibrations, an impact or the like.

Although a material for forming the positive electrode current collector 500 is not limited, for example, in the same manner as the positive electrode substrate layer of the electrode assembly 400, the positive electrode current collector 500 is made of aluminum, an aluminum alloy or the like. Although a material for forming the negative electrode current collector 600 is not also limited, for example, in the same manner as the negative electrode substrate layer of the electrode assembly 400, the negative electrode current collector 600 is made of copper, a copper alloy or the like.

As shown in FIG. 2, the positive electrode current collector 500 is joined to the positive electrode converged portion 410 of the electrode assembly 400 at a plurality of joined portions 20. The negative electrode current collector 600 is joined to the negative electrode converged portion 420 of the electrode assembly 400 at a plurality of joined portions 30. Hereinafter, specific configurations of the positive electrode current collector 500 and the negative electrode current collector 600, and specific configurations of the joined portions 20, 30 are described in more detail. The positive electrode current collector 500 and the negative electrode current collector 600 have substantially the same configuration and hence, hereinafter, the description is made with respect to the configuration of the positive electrode current collector 500 and the joined portion 20, and the description with respect to the configuration of the negative electrode current collector 600 and the joined portion 30 is omitted.

Figure 4:
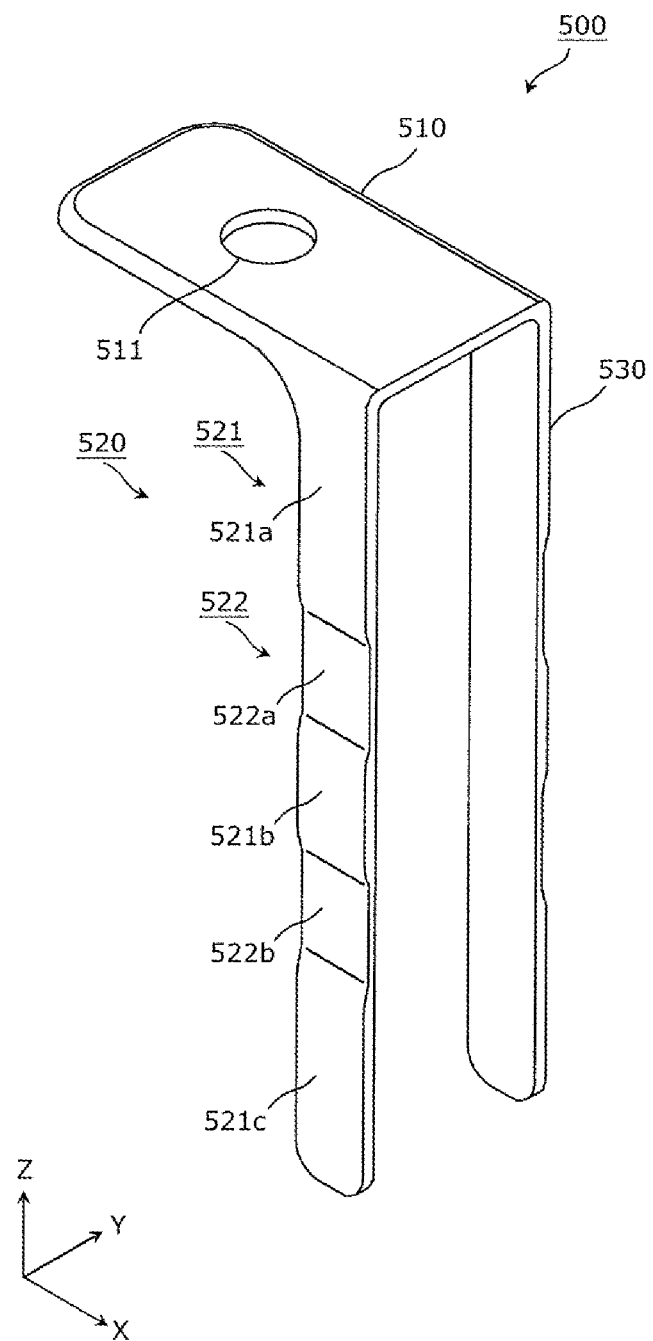
FIG. 4 is a perspective view showing the configuration of a positive electrode current collector according to the embodiment of the present invention.
Figure 5:
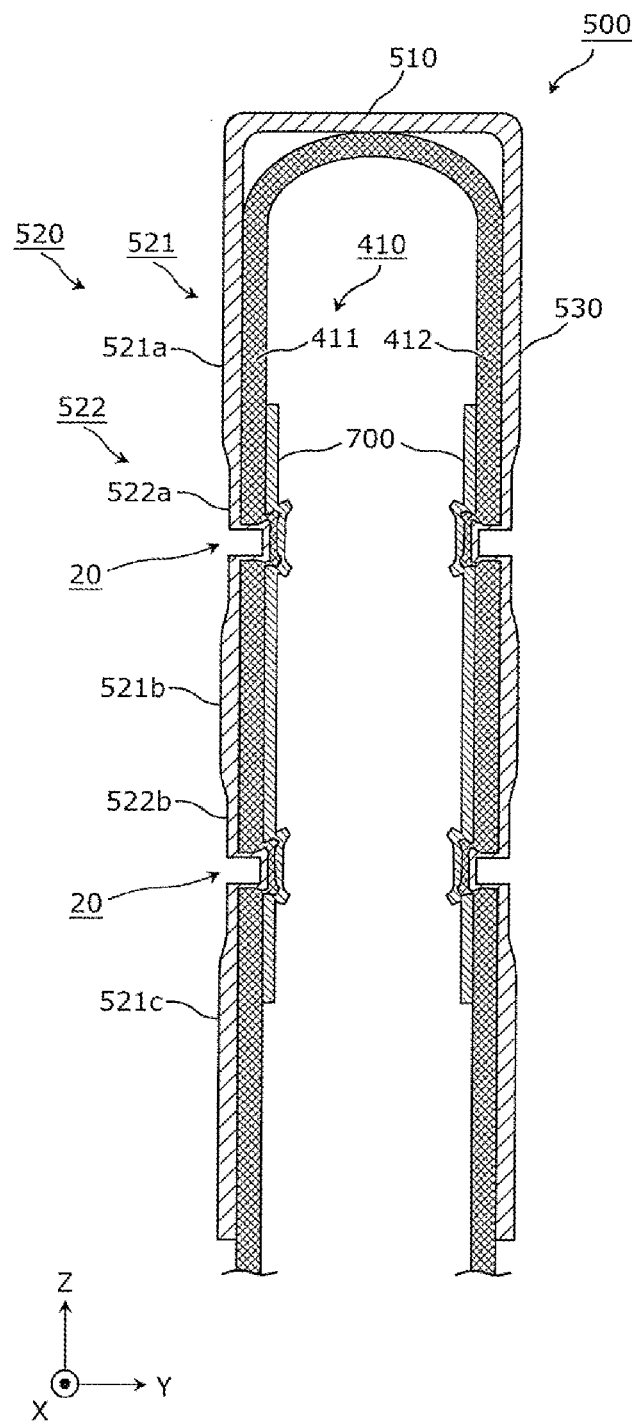
FIG. 5 is a cross-sectional view showing the configuration where the positive electrode current collector according to the embodiment of the present invention is joined to a positive electrode converged portion of the electrode assembly.

First, the configuration of the positive electrode current collector 500 is described. FIG. 4 is a perspective view showing the configuration of the positive electrode current collector 500 according to the embodiment of the present invention. FIG. 4 is a view showing the configuration of the positive electrode current collector 500 before the positive electrode current collector 500 is joined to the electrode assembly 400. FIG. 5 is a cross-sectional view showing the configuration where the positive electrode current collector 500 according to the embodiment of the present invention is joined to the positive electrode converged portion 410 of the electrode assembly 400. To be more specific, FIG. 5 shows a cross-sectional configuration of the positive electrode current collector 500 and the positive electrode converged portion 410 shown in FIG. 2 taken along a YZ plane which passes the joined portions 20.

As shown in these drawings, the positive electrode current collector 500 has a terminal connecting portion 510, and electrode connecting portions 520, 530 which extend from both end portions of the terminal connecting portion 510 in the Y axis direction toward a minus side in the Z axis direction.

The terminal connecting portion 510 is a portion to be connected to the positive electrode terminal 200. That is, the terminal connecting portion 510 is a flat-plate-like portion disposed on a positive electrode terminal 200 side (an upper side, a plus side in the Z axis direction) of the positive electrode current collector 500, and is electrically and mechanically (physically) connected to the positive electrode terminal 200.

To be more specific, an opening portion 511 which is a through hole having a circular shape into which the projecting portion 210 of the positive electrode terminal 200 is inserted is formed in the terminal connecting portion 510.

The terminal connecting portion 510 is fixed to the positive electrode terminal 200 by swaging the projecting portion 210 together with the lid body 110 in a state where the projecting portion 210 is inserted into the opening portion 511. That is, the projecting portion 210 is formed of a rivet, for example, and the terminal connecting portion 510 is fixed to the lid body 110 together with the positive electrode terminal 200 by swaging using the rivet.

The opening portion 511 may not be formed in a circular shape, and may be formed in an elliptical shape or a rectangular shape. However, it is preferable that the opening portion 511 be formed in a shape corresponding to an outer shape of the projecting portion 210. The opening portion 511 is not limited to the through hole, and may be a cutout formed by cutting out the terminal connecting portion 510 in a semicircular shape or a rectangular shape.

The electrode connecting portions 520, 530 are portions to be connected to the electrode assembly 400. That is, the electrode connecting portions 520, 530 are flat-plate-like portions which are disposed in an electrode assembly 400 side (a lower side, a minus side in the Z axis direction) of the positive electrode current collector 500, and are electrically and mechanically (physically) connected to the electrode assembly 400. To be more specific, as shown in FIG. 5, the electrode connecting portions 520, 530 are respectively connected to flat converged portions 411, 412 which are two opposedly facing flat converged portions of the positive electrode converged portion 410 of the electrode assembly 400.

To be furthermore specific, the electrode connecting portion 520 is an elongated and flat-plate-like portion extending downward toward a minus side in the Z axis direction from an end portion of the terminal connecting portion 510 on a minus side in the Y axis direction, and is connected to the flat converged portion 411. In the same manner, the electrode connecting portion 530 is an elongated and flat-plate-like portion which extends downward in the Z axis direction from an end portion of the terminal connecting portion 510 on a plus side in the Y axis direction toward the minus side, and is connected to the flat converged portion 412. In this embodiment, the electrode connecting portion 520 and the electrode connecting portion 530 have substantially the same configuration and hence, hereinafter, the description is made with respect to the configuration of the electrode connecting portion 520, and the description with respect to the configuration of the electrode connecting portion 530 is omitted.

The electrode connecting portion 520 has a first portion 521, and a second portion 522 having a smaller wall thickness than the first portion 521. That is, the second portion 522 is a thin wall thickness portion formed on the electrode connecting portion 520. The first portion 521 includes a terminal-side first portion 521a, an intermediate first portion 521b, and a distal-end-side first portion 521c. The second portion 522 includes a terminal-side second portion 522a and a distal-end-side second portion 522b.

The terminal-side first portion 521a is a rectangular-shaped flat-plate-like portion which is disposed between the terminal connecting portion 510 and the terminal-side second portion 522a of the second portion 522. That is, the terminal-side first portion 521a is a portion elongated in the Z axis direction which has one end (an end portion on a plus side in the Z axis direction) thereof connected to the terminal connecting portion 510 and the other end (an end portion on a minus side in the Z axis direction) thereof connected to the terminal-side second portion 522a.

The intermediate first portion 521b is a rectangular-shaped flat-plate-like portion disposed between the terminal-side second portion 522a and the distal-end-side second portion 522b of the second portion 522. That is, the intermediate first portion 521b is a portion having a substantially square shape as viewed in a plan view (as viewed in the Y axis direction) which has one end (an end portion on a plus side in the Z axis direction) thereof connected to the terminal-side second portion 522a and the other end (an end portion on a minus side in the Z axis direction) thereof connected to the distal-end-side second portion 522b.

The distal-end-side first portion 521c is a rectangular-shaped flat-plate-like portion disposed on a lower side of the distal-end-side second portion 522b (a minus side in the Z axis direction). That is, the distal-end-side first portion 521c is a portion elongated in the Z axis direction which has one end (an end portion on a plus side in the Z axis direction) thereof connected to the distal-end-side second portion 522b.

In this embodiment, although the terminal-side first portion 521a, the intermediate first portion 521b, and the distal-end-side first portion 521c are formed so as to have the same thickness (thickness in the Y axis direction), the terminal-side first portion 521a, the intermediate first portion 521b, and the distal-end-side first portion 521c may be formed so as to have different thicknesses.

The terminal-side second portion 522a is a rectangular-shaped flat-plate-like portion disposed between the terminal-side first portion 521a of the first portion 521 and the intermediate first portion 521b. That is, the terminal-side second portion 522a is a portion having a substantially square shape as viewed in a plan view (as viewed in the Y axis direction) which has one end (an end portion on a plus side in the Z axis direction) thereof connected to the terminal-side first portion 521a and the other end (an end portion on a minus side in the Z axis direction) thereof connected to the intermediate first portion 521b.

Further, the terminal-side second portion 522a is a thin wall thickness portion which is formed so as to have a thickness smaller than a thickness of the terminal-side first portion 521a and a thickness of the intermediate first portion 521b by press forming, cutting or the like. For example, the terminal-side second portion 522a is formed with a thickness approximately ½ to ⅔ of the thickness of the terminal-side first portion 521a and the intermediate first portion 521b. When the terminal-side first portion 521a and the intermediate first portion 521b differ from each other in thickness, it is sufficient that the terminal-side second portion 522a be formed with a thickness smaller than either one of a thickness of the terminal-side first portion 521a or a thickness of the intermediate first portion 521b. However, it is preferable that the terminal-side second portion 522a be formed with a thickness smaller than both a thickness of the terminal-side first portion 521a and a thickness of the intermediate first portion 521b.

The distal-end-side second portion 522b is a rectangular-shaped flat-plate-like portion disposed between the intermediate first portion 521b and the distal-end-side first portion 521c of the first portion 521. That is, the distal-end-side second portion 522b is a portion having a substantially square shape as viewed in a plan view (as viewed in the Y axis direction) which has one end (an end portion on a plus side in the Z axis direction) thereof connected to the intermediate first portion 521b and the other end (an end portion on a minus side in the Z axis direction) thereof connected to the distal-end-side first portion 521c.

The distal-end-side second portion 522b is a thin wall thickness portion which is formed so as to have a thickness smaller than thicknesses of the intermediate first portion 521b and the distal-end-side first portion 521c by press forming, cutting or the like. For example, the distal-end-side second portion 522b is formed with a thickness approximately ½ to ⅔ of the thickness of the intermediate first portion 521b and the distal-end-side first portion 521c. When the intermediate first portion 521b and the distal-end-side first portion 521c differ from each other in thickness, it is sufficient that the distal-end-side second portion 522b be formed with a thickness smaller than either one of a thickness of the intermediate first portion 521b or a thickness of the distal-end-side first portion 521c. However, it is preferable that the distal-end-side second portion 522b be formed with a thickness smaller than both a thickness of the intermediate first portion 521b and a thickness of the distal-end-side first portion 521c.

As described above, the electrode connecting portion 520 has the plurality of first portions, and the plurality of second portions having thicknesses smaller than thicknesses of the plurality of first portions between the plurality of first portions. That is, the first portion 521 is configured such that at least a portion of the first portion 521 (the terminal-side first portion 521a) is disposed between the terminal connecting portion 510 and the second portion (the terminal-side second portion 522a). At least a portion of the first portion 521 (the intermediate first portion 521b) is disposed between the plurality of second portions (the terminal-side second portion 522a and the distal-end-side second portion 522b).

As shown in FIG. 5, the second portion 522 is a portion joined to the electrode assembly 400. That is, in the electrode connecting portion 520, the first portion 521 is connected to (brought into contact with) the electrode assembly 400 but is not joined (fixed) to the electrode assembly 400. The electrode connecting portion 520 is joined (fixed) to the electrode assembly 400 by way of the second portion 522 having the smaller wall thickness than the first portion 521. To be more specific, the second portion 522 is mechanically connected to the flat converged portion 411 of the positive electrode converged portion 410 at two portions. At the terminal-side second portion 522a and at the distal-end-side second portion 522b, two joined portions 20 are formed.

To be more specific, cover member 700 is disposed inside the flat converged portion 411, and the terminal-side second portion 522a, the distal-end-side second portion 522b, the flat converged portion 411, and the cover member 700 are mechanically joined to each other thus forming two joined portions 20. The cover member 700 is a cover which protects the flat converged portion 411, and is disposed at a position where the cover member 700 sandwiches the flat converged portion 411 of the positive electrode converged portion 410 of the electrode assembly 400 in cooperation with the electrode connecting portion 520. The cover member 700 is a rectangular-shaped flat-plate-like member which extends in the Z axis direction along the flat converged portion 411, and is formed so as to have a uniform thickness in a state before being joined. A cover member 700 is disposed also on an electrode connecting portion 530 side in the same manner.

Although a material for forming the cover member 700 is not particularly limited. However, for example, in the same manner as the positive electrode substrate layer of the electrode assembly 400, the cover member 700 is a metal member made of aluminum, an aluminum alloy or the like. A cover member is disposed also to the negative electrode side in the same manner as the positive electrode side. Although a material for forming the cover member on the negative electrode side is not also particularly limited. However, for example, in the same manner as the negative electrode substrate layer of the electrode assembly 400, the cover member is a metal member made of copper, a copper alloy or the like.

Figure 6:
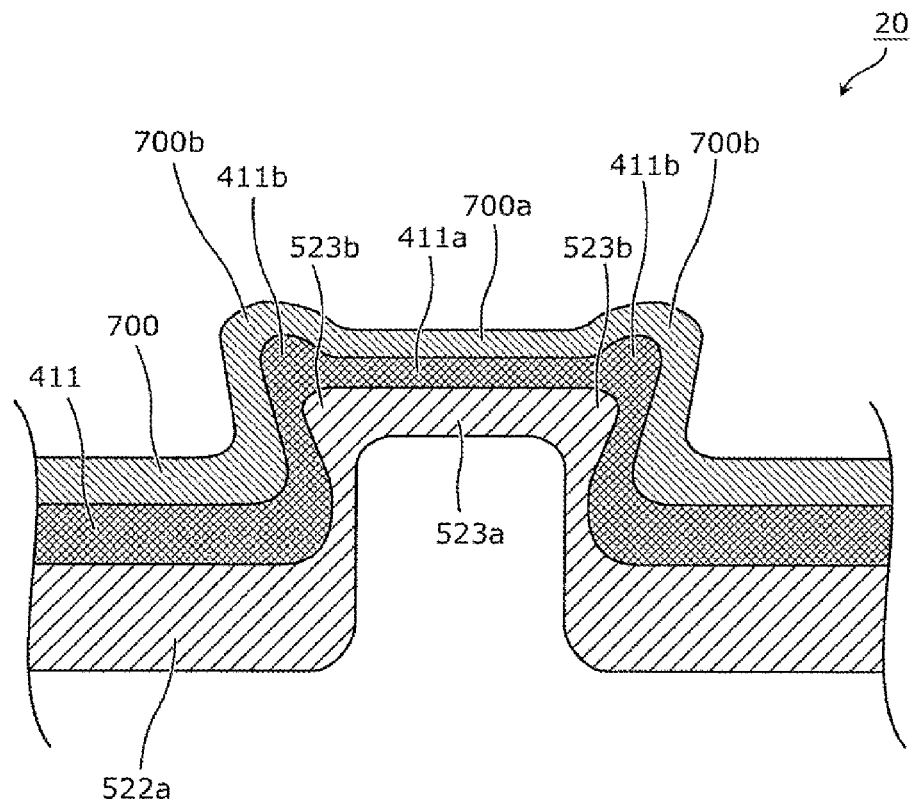
FIG. 6 is a cross-sectional view showing the configuration of a joined portion between the positive electrode current collector and the electrode assembly according to the embodiment of the present invention.
Figure 6:
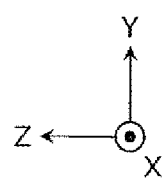

Next, the configuration of the joined portion 20 is described. FIG. 6 is a cross-sectional view showing the configuration of the joined portion 20 between the positive electrode current collector 500 and the electrode assembly 400 according to the embodiment of the present invention. To be more specific, FIG. 6 is an enlarged cross-sectional view showing in FIG. 5 in an enlarged manner the configuration of the joined portion 20 which is formed by joining the terminal-side second portion 522a, the flat converged portion 411, and the cover member 700 to each other.

As shown in FIG. 6, the second portion 522, the electrode assembly 400, and the cover member 700 form a first convex portions each projecting toward the cover member 700 side (a plus side in the Y axis direction in the drawing) at the joined portion 20. That is, either one of the second portion 522 or the electrode assembly 400 (the second portion 522 in this embodiment) has a first convex portion (a first current collector convex portion 523a described later) which projects toward the other (the electrode assembly 400) in the joined portion 20. The other (the electrode assembly 400) has a first convex portion (a first electrode assembly convex portion 411a described later) which projects toward a side opposite to the one (the second portion 522) in the joined portion 20. Further, either one of the cover member 700 or the electrode assembly 400 (the electrode assembly 400 in this embodiment) has a first convex portion (a first electrode assembly convex portion 411a) which projects toward the other (the cover member 700 in this embodiment) in the joined portion 20. The other (the cover member 700) has a first convex portion (a first cover convex portion 700a described later) which projects toward a side opposite to the one (the electrode assembly 400) in the joined portion 20.

Each of the first convex portions has a second convex portion which projects in a direction intersecting with a projecting portion of the first convex portion. The first convex portions and the second convex portions are formed by plastically deforming the second portion 522, the electrode assembly 400, and the cover member 700 in the joined portion 20. In this embodiment, the first convex portions and the second convex portions are formed by swaging (to be more specific, by clinch joining) the second portion 522, the electrode assembly 400, and the cover member 700 in the joined portion 20.

To be more specific, the terminal-side second portion 522a of the second portion 522 has a first current collector convex portion 523a which projects toward the flat converged portion 411 of the electrode assembly 400 in the joined portion 20. That is, the first current collector convex portion 523a is a convex portion having a circular cylindrical shape which projects in a direction (toward a plus side in the Y axis direction) orthogonal to a joining surface (a surface parallel to the XZ plane) between the terminal-side second portion 522a and the flat converged portion 411. In other words, the first current collector convex portion 523a has a shape recessed toward the flat converged portion 411 from an outer surface (a surface parallel to the XZ plane on a minus side in the Y axis direction) of the terminal-side second portion 522a.

The first current collector convex portion 523a has a second current collector convex portion 523b which projects in a direction intersecting with a projecting direction (Y axis direction) of the first current collector convex portion 523a. In this embodiment, the second current collector convex portion 523b projects in a direction orthogonal to the projecting direction (Y axis direction). To be more specific, the second current collector convex portion 523b is formed so as to project all directions perpendicular to the projecting direction of the first current collector convex portion 523a from a distal end of the first current collector convex portion 523a. That is, the second current collector convex portion 523b is formed in an annular shape on a distal end of the first current collector convex portion 523a so as to expand from the distal end of the first current collector convex portion 523a.

The projecting direction of the first current collector convex portion 523a and the projecting direction of the second current collector convex portion 523b are not limited to the above-mentioned directions, and may be directions inclined from the above-mentioned directions respectively. The projecting shapes of the first current collector convex portion 523a and the second current collector convex portion 523b are also not limited to the above-mentioned projecting shapes. The second current collector convex portion 523b may not be formed on the whole circumference of the distal end of the first current collector convex portion 523a, and may be formed on only a portion of the whole circumference of the distal end.

In the joined portion 20, the flat converged portion 411 of the electrode assembly 400 has a first electrode assembly convex portion 411a which projects toward the cover member 700. That is, the first electrode assembly convex portion 411a is a convex portion having a circular cylindrical shape which projects in a direction (toward a plus side in the Y axis direction) orthogonal to the joining surface (a surface parallel to the XZ plane) between the flat converged portion 411 and the cover member 700. In other words, the first electrode assembly convex portion 411a has a shape recessed from a surface (a surface parallel to the XZ plane on a minus side in the Y axis direction) of the flat converged portion 411 on terminal-side second portion 522a side in a direction (toward a plus side in the Y axis direction) orthogonal to the joining surface (a surface parallel to the XZ plane) between the terminal-side second portion 522a and the flat converged portion 411.

The first electrode assembly convex portion 411a has a second electrode current collector convex portion 411b which projects in a direction intersecting with a projecting direction (Y axis direction) of the first electrode assembly convex portion 411a. In this embodiment, the second electrode assembly convex portion 411b projects in the direction orthogonal to the projecting direction of the first electrode assembly convex portion 411a (Y axis direction). To be more specific, the second electrode assembly convex portion 411b is formed so as to project in all directions perpendicular to the projecting direction of the first electrode assembly convex portion 411a from a distal end of the first electrode assembly convex portion 411a. That is, the second electrode assembly convex portion 411b is formed in an annular shape on the distal end of the first electrode assembly convex portion 411a so as to expand from the distal end of the first electrode assembly convex portion 411a.

The projecting direction of the first electrode assembly convex portion 411a and the projecting direction of the second electrode assembly convex portion 411b are not limited to the above-mentioned directions, and may be directions inclined from the above-mentioned directions respectively. Further, the projecting shapes of the first electrode assembly convex portion 411a and the second electrode assembly convex portion 411b are not limited to the above-mentioned projecting shape. The second electrode assembly convex portion 411b may not be formed on the whole circumference of the distal end of the first electrode assembly convex portion 411a, and may be formed on only a portion of the whole circumference of the distal end.

In the joined portion 20, the cover member 700 has a first cover convex portion 700a which projects in a direction away from the flat converged portion 411. That is, the first cover convex portion 700a is a convex portion having a circular cylindrical shape which projects in a direction (toward a plus side in the Y axis direction) orthogonal to a joining surface (a surface parallel to the XZ plane) between the flat converged portion 411 and the cover member 700. In other words, the first cover convex portion 700a has a shape recessed from a surface of the cover member 700 on a flat converged portion 411 side (a surface parallel to the XZ plane on a minus side in the Y axis direction) in a direction (toward a plus side in the Y axis direction) orthogonal to the surface of the cover member 700 on the flat converged portion 411 side.

The first cover convex portion 700a has a second cover convex portion 700b which projects in a direction intersecting with the projecting direction (Y axis direction) of the first cover convex portion 700a. In this embodiment, the second cover convex portion 700b projects in a direction orthogonal to the projecting direction of the first cover convex portion 700a (Y axis direction). To be more specific, the second cover convex portion 700b is formed so as to project in all directions perpendicular to the projecting direction from a distal end of the first cover convex portion 700a. That is, the second cover convex portion 700b is formed in an annular shape on the distal end of the first cover convex portion 700a so as to expand from the distal end of the first cover convex portion 700a.

The projecting direction of the first cover convex portion 700a and the projecting direction of the second cover convex portion 700b are not limited to the above-mentioned directions, and may be directions inclined from the above-mentioned directions respectively. The projecting shapes of the first cover convex portion 700a and the second cover convex portion 700b are also not limited to the above-mentioned projecting shape. The second cover convex portion 700b may not be formed on the whole circumference of the distal end of the first cover convex portion 700a, and may be formed on only a portion of the whole circumference of the distal end.

Figure 7A:
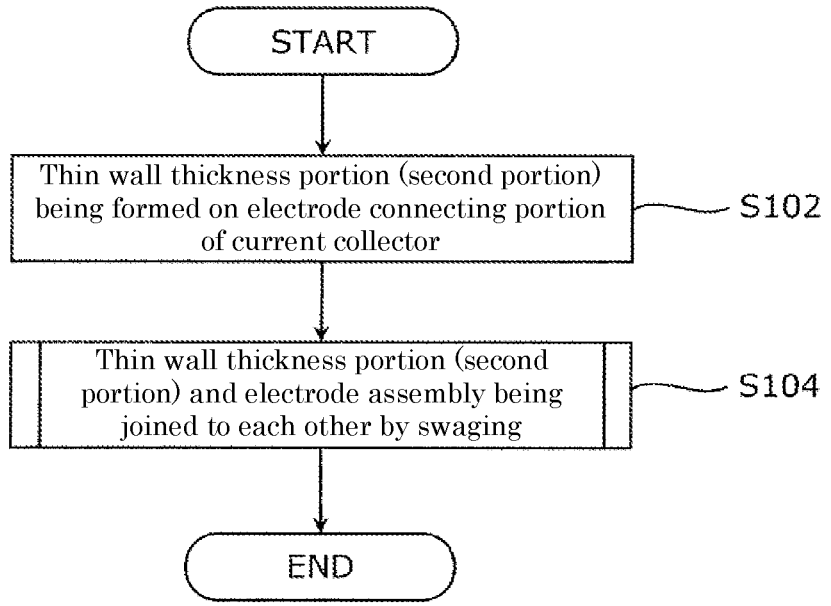
FIG. 7A is a flowchart showing a method of manufacturing an energy storage device according to the embodiment of the present invention.
Figure 7B:
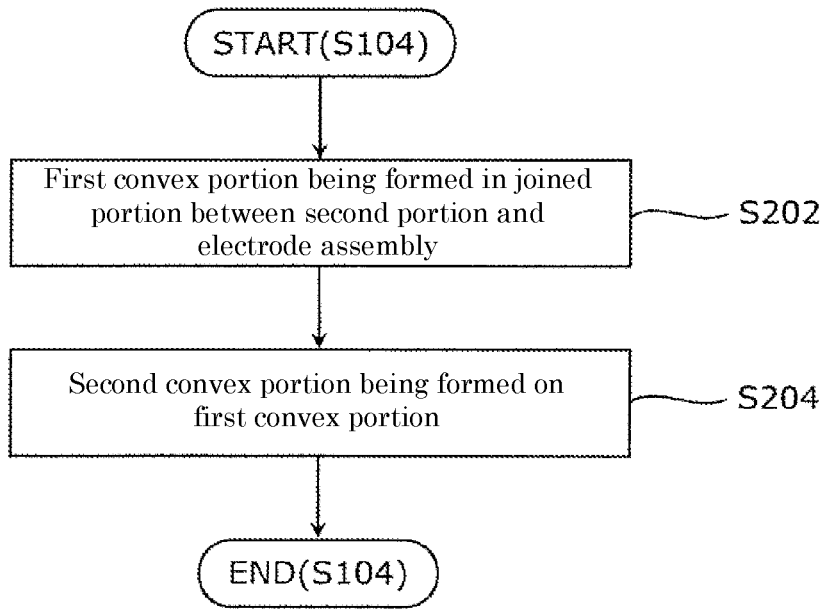
FIG. 7B is a flowchart showing the method of manufacturing an energy storage device according to the embodiment of the present invention.

Next, a method of manufacturing the energy storage device 10 is described. FIG. 7A and FIG. 7B are flowcharts showing the method of manufacturing the energy storage device 10 according to the embodiment of the present invention. To be more specific, FIG. 7A is, in the method of manufacturing the energy storage device 10, the flowchart showing a step of joining the current collector and the electrode assembly 400 to each other. FIG. 7B is the flowchart showing a step of forming the first convex portions and the second convex portions on the current collector. The positive electrode current collector 500 and the negative electrode current collector 600 have substantially the same configuration and hence, hereinafter, the description is made with respect to the configuration on a positive electrode current collector 500 side, and the description with respect to the configuration on a negative electrode current collector 600 side is omitted.

First, as shown in FIG. 7A, on the electrode connecting portion 520 of the positive electrode current collector 500, the thin wall thickness portion having a smaller wall thickness than other portion is formed (S102). To be more specific, the second portion 522 (the terminal-side second portion 522a and the distal-end-side second portion 522b) shown in FIG. 4 is formed on the electrode connecting portion 520 by press forming, cutting or the like.

The thin wall thickness portion formed on the electrode connecting portion 520 and the electrode assembly 400 are joined to each other by plastically deforming the thin wall thickness portion and the electrode assembly 400 (S104). That is, the second portion 522 (the terminal-side second portion 522a and the distal-end-side second portion 522b) formed on the electrode connecting portion 520 and the flat converged portion 411 of the positive electrode converged portion 410 of the electrode assembly 400 are joined to each other by swaging.

Here, in such a joining by plastic deformation (swaging) (S104 in FIG. 7A), as shown in FIG. 7B, first, the first convex portion is formed on the joined portion between the second portion 522 and the electrode assembly 400 (S202). That is, the first convex portion is formed on the second portion 522, the electrode assembly 400, and the cover member 700. To be more specific, the terminal-side second portion 522a of the second portion 522, the flat converged portion 411 of the electrode assembly 400, and the cover member 700 are disposed in a stacked manner to each other in this order, and these components are deformed by pressing a punch (convex portion) of a joining tool to the terminal-side second portion 522a. To be more specific, the joining tool is formed of a convex-shaped punch and a die. The terminal-side second portion 522a, the flat converged portion 411, and the cover member 700 are plastically deformed by pressing the punch to the die from a terminal-side second portion 522a side in a state where the die is disposed on a cover member 700 side.

With such an operation, the first current collector convex portion 523a, the first electrode assembly convex portion 411a and the first cover convex portion 700a are formed substantially simultaneously. As shown in FIG. 6, the first current collector convex portion 523a, the first electrode assembly convex portion 411a, and the first cover convex portion 700a are configured to have thicknesses smaller than thicknesses of other portions of the terminal-side second portion 522a, the flat converged portion 411, and the cover member 700 respectively.

Returning to FIG. 7B, next, the second convex portion is formed on the first convex portion (S204). That is, the second current collector convex portion 523b is formed on the first current collector convex portion 523a, the second electrode assembly convex portion 411b is formed on the first electrode assembly convex portion 411a, and the second cover convex portion 700b is formed on the first cover convex portion 700a respectively. To be more specific, by pressing the distal end portion of the first current collector convex portion 523a, the distal end portion of the first electrode assembly convex portion 411a, and the distal end portion of the first cover convex portion 700a respectively, the second current collector convex portion 523b, the second electrode assembly convex portion 411b, and the second cover convex portion 700b are respectively formed on the respective distal end portions.

In this embodiment, the first convex portion and the second convex portion are formed substantially simultaneously by a so-called clinch joining where the step of forming the first convex portion (S202) and the step of forming the second convex portion (S204) are performed substantially simultaneously by a series of pressing. The press forming may be performed twice such that the first convex portion is formed by first pressing, and the second convex portion is formed by second pressing.

As described above, according to the energy storage device 10 of the embodiment of the present invention, the second portion 522 of the positive electrode current collector 500 has the first current collector convex portion 523a extending toward the electrode assembly 400 in the joined portion 20. That is, the second portion 522 of the positive electrode current collector 500 forms the first current collector convex portion 523a and bites into the electrode assembly 400 and hence, the positive electrode current collector 500 and the electrode assembly 400 are firmly joined to each other. With such a configuration, the second portion 522 is a portion having the smaller wall thickness than the first portion 521 and hence, the first current collector convex portion 523a can be formed and the positive electrode current collector 500 and the electrode assembly 400 can be joined to each other with a small amount of force. Accordingly, a small joining tool can be used and hence, an active material non-applied portion of the electrode assembly 400 is small whereby lowering of energy density of the energy storage device 10 can be suppressed.

That is, for example, the joining tool for joining the electrode connecting portion 520 of the positive electrode current collector 500 and the flat converged portion 411 of the electrode assembly 400 to each other is disposed such that the electrode connecting portion 520 and the flat converged portion 411 are sandwiched between the punch and the die. In this case, larger a thickness of a member which is an object to be joined, it is necessary to increase an inner diameter of a hole in which a punch is inserted. Accordingly, by performing joining at the second portion 522 of the positive electrode current collector 500 having a small thickness, a die having a small inner diameter can be used. With the use of the die having the small inner diameter, a width of the electrode connecting portion 520 (a width in the X axis direction) can be narrowed and hence, a width (a width in the X axis direction) of the active material non-applied portion of the flat converged portion 411 can be narrowed. With such a configuration, an area of the active material non-applied portion of the electrode assembly 400 can be small thus suppressing the decrease of an area of the active material layer of the electrode assembly 400 and hence, it is possible to suppress lowering of energy density of the energy storage device 10.

In this manner, according to the energy storage device 10, by forming the first current collector convex portion 523a, lowering of performance of the energy storage device 10 can be suppressed while firmly joining the electrode assembly 400 and the positive electrode current collector 500 to each other. Further, the first portion 521 of the positive electrode current collector 500 has a larger thickness than the second portion 522 of the positive electrode current collector 500 and hence, lowering of a strength of the positive electrode current collector 500 at the second portion 522 can be suppressed by the first portion 521 whereby lowering of performance of the energy storage device 10 can be suppressed.

In the positive electrode current collector 500, at least the portion of the first portion 521 is disposed between the terminal connecting portion 510 connected to the positive electrode terminal 200 and the second portion 522 joined to the electrode assembly 400. That is, the portion having a large thickness is disposed between the terminal connecting portion 510 and the second portion 522 and hence, a strength between the terminal connecting portion 510 and the second portion 522 can be ensured whereby lowering of performance of the energy storage device 10 can be suppressed.

In the positive electrode current collector 500, at least a portion of the first portion 521 is disposed between the second portions 522 (the terminal-side second portion 522a and the distal-end-side second portion 522b). That is, the portion having a large thickness is disposed between the second portions 522 having a small thickness and hence, a strength between the second portions 522 can be ensured whereby lowering of performance of the energy storage device 10 can be suppressed.

Since the second portion (the second current collector convex portion 523b, the second electrode assembly convex portion 411b, and the second cover convex portion 700b) is formed on the first convex portion (the first current collector convex portion 523a, the first electrode assembly convex portion 411a and the first cover convex portion 700a), the first convex portion is minimally removed. Accordingly, a joining strength between the positive electrode current collector 500 and the electrode assembly 400 can be enhanced.

The second convex portion is formed so as to project in all circumferential directions from the distal end of the first convex portion and hence, the joining strength between the positive electrode current collector 500 and the electrode assembly 400 can be further enhanced.

Further, according to the method of manufacturing the energy storage device 10 of the embodiment of the present invention, by forming the thin wall thickness portion (the second portion 522) having a smaller wall thickness than other portions on the electrode connecting portion 520 of the positive electrode current collector 500, and by plastically deforming (that is, by swaging) the thin wall thickness portion and the electrode assembly 400, the positive electrode current collector 500 and the electrode assembly 400 are joined to each other. That is, by joining the positive electrode current collector 500 and the electrode assembly 400 to each other by plastic deformation at the thin wall thickness portion, the positive electrode current collector 500 and the electrode assembly 400 can be joined to each other with a small amount of force. Accordingly, a small joining tool can be used and hence, the active material non-applied portion of the electrode assembly 400 (a width of the active material non-applied portion can be narrowed) can be made small whereby lowering of the performance of the energy storage device 10 can be suppressed. Further, other portions of the positive electrode current collector 500 except for the thin wall thickness portion have a large thickness and hence, lowering of a strength of the positive electrode current collector 500 at the thin wall thickness portion can be suppressed by such other portions whereby lowering of performance of the energy storage device 10 can be suppressed.

The negative electrode current collector 600 side also has substantially the same configuration as the positive electrode current collector 500 side and hence, the negative electrode current collector 600 side can acquire substantially the same advantageous effects as the positive electrode current collector 500 side.

Modification 1

Next, a modification 1 of the above-mentioned embodiment is described. In the above-mentioned embodiment, the cover member 700 is formed of a flat-plate-like member having a uniform thickness. However, in this modification, a cover member has a thin wall thickness portion.

Figure 8:
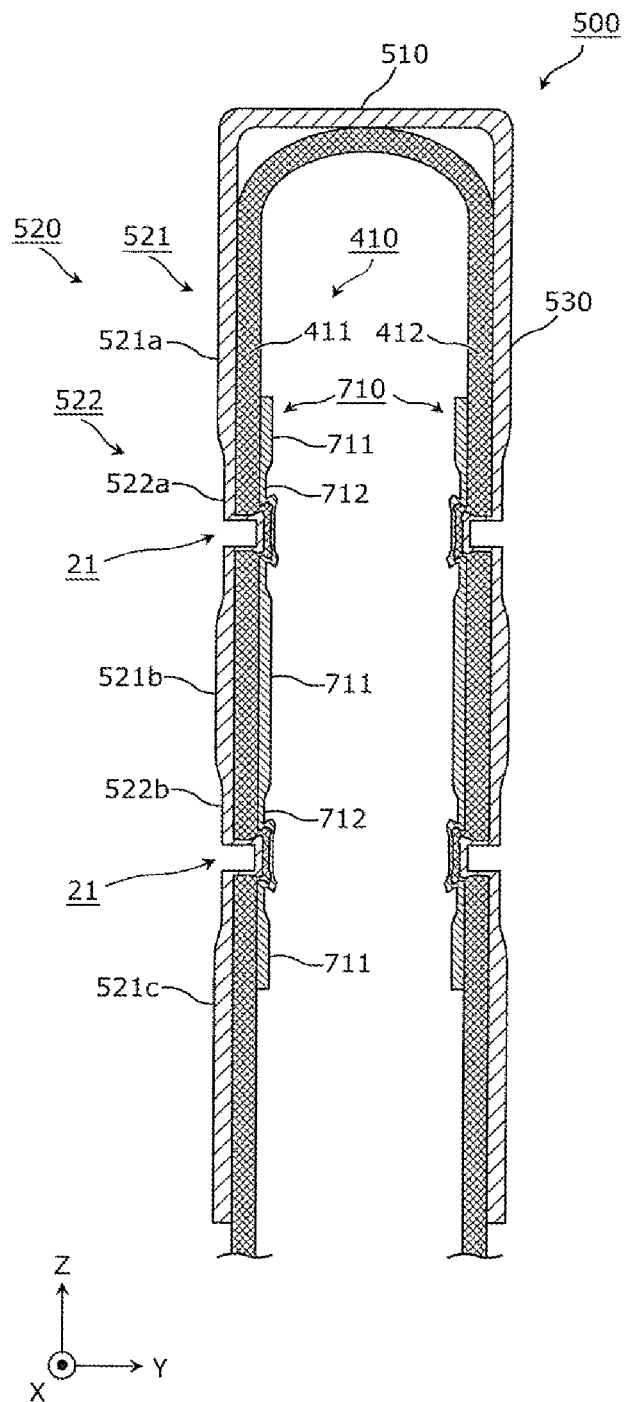
FIG. 8 is a cross-sectional view showing the configuration where a positive electrode current collector according to a modification 1 of the embodiment of the present invention is joined to a positive electrode converged portion of an electrode assembly.

FIG. 8 is a cross-sectional view showing the configuration where a positive electrode current collector 500 according to the modification 1 of the embodiment of the present invention is joined to a positive electrode converged portion 410 of an electrode assembly 400. To be more specific, FIG. 8 is a view corresponding to FIG. 5.

As shown in FIG. 8, a cover member 710 is disposed inside a flat converged portion 411, and a terminal-side second portion 522a and a distal-end-side second portion 522b, the flat converged portion 411, and the cover member 710 are mechanically joined to each other (for example, joined by swaging) thus forming two joined portions 21. The cover member 710 is a cover which protects the flat converged portion 411. The cover member 710 is disposed at a position where the cover member 710 sandwiches the flat converged portion 411 of the positive electrode converged portion 410 of the electrode assembly 400 in cooperation with an electrode connecting portion 520. A cover member 710 is disposed also on an electrode connecting portion 530 side in the same manner.

In this modification 1, the cover member 710 is a rectangular-shaped flat-plate-like member which extends in the Z axis direction along the flat converged portion 411, and has first cover portions 711, and second cover portions 712 having a smaller wall thickness than the first cover portions 711. To be more specific, the cover member 710 includes the plurality of first cover portions 711, and the plurality of second cover portions 712 having a smaller wall thickness than the plurality of first cover portions 711 between the plurality of first cover portions 711 respectively. That is, the second cover portions 712 are thin wall thickness portions formed on the cover member 710, and are formed with a thickness approximately ½ to ⅔ of the thickness of the first cover portion 711 by press forming, cutting or the like, for example.

The second cover portion 712 is a portion joined to the positive electrode current collector 500 and the electrode assembly 400. To be more specific, the second cover portion 712 is joined to the flat converged portion 411 of the positive electrode converged portion 410 at two portions, that is, at a terminal-side second portion 522a and a distal-end-side second portion 522b so that two joined portions 21 are formed.

As has been described above, according to the energy storage device of this modification, in the same manner as the above-mentioned embodiment, lowering of performance of the energy storage device can be suppressed while firmly joining the electrode assembly 400 and the current collector to each other. Particularly, according to this modification, the cover member 710 is joined to the electrode assembly 400 also at the second cover portion 712 having a small wall thickness and hence, the positive electrode current collector 500 and the cover member 710 can be joined to the electrode assembly 400 with a smaller force. Accordingly, a smaller joining tool can be used and hence, lowering of performance of the energy storage device can be further suppressed. The first cover portion 711 has a larger wall thickness than the second cover portion 712 and hence, lowering of a strength of the cover member 710 at the second cover portion 712 can be suppressed by the first cover portion 711 whereby lowering of performance of the energy storage device can be suppressed.

In this modification, the configuration of the positive electrode current collector 500 on the electrode connecting portion 520 side is described in detail. On the other hand, the configuration on an electrode connecting portion 530 side is substantially equal to the configuration on the electrode connecting portion 520 side, and the negative electrode current collector 600 also has substantially the same configuration. The same goes also for the following modifications.

Modification 2

Next, a modification 2 of the above-mentioned embodiment is described. In the above-mentioned embodiment, in the positive electrode current collector 500, at least a portion (the intermediate first portion 521b) of the first portion 521 is disposed between the plurality of second portions (the terminal-side second portion 522a and the distal-end-side second portion 522b). However, in this modification, a first portion 521 is not disposed between a plurality of second portions.

Figure 9:
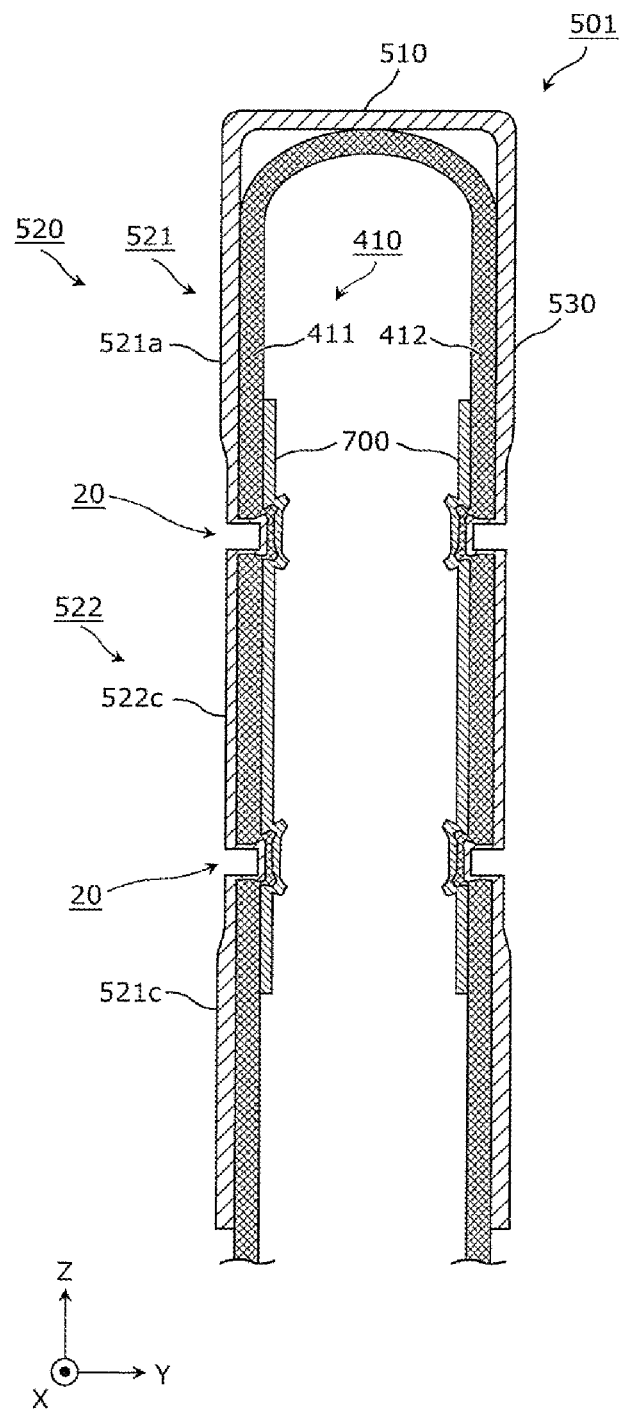
FIG. 9 is a cross-sectional view showing the configuration according to a modification 2 of the embodiment of the present invention where a positive electrode current collector is joined to a positive electrode converged portion of an electrode assembly.

FIG. 9 is a cross-sectional view showing the configuration where a positive electrode current collector 501 according to the modification 2 of the embodiment of the present invention is joined to a positive electrode converged portion 410 of an electrode assembly 400. To be more specific, FIG. 9 is a view corresponding to FIG. 5.

As shown in FIG. 9, the positive electrode current collector 501 according to this modification has a second portion 522c in place of the intermediate first portion 521b, the terminal-side second portion 522a, the distal-end-side second portion 522b of the positive electrode current collector 500 according to the above-mentioned embodiment. That is, the intermediate first portion 521b of the above-mentioned embodiment is formed into a thin wall thickness portion and is integrally formed with the terminal-side second portion 522a and the distal-end-side second portion 522b thus forming the second portion 522c of this modification. In other words, two joined portions 20 are formed on one second portion 522c.

With such a configuration, the second portion 522 has only one second portion 522c, and the first portion 521 is configured to have a terminal-side first portion 521a and a distal-end-side first portion 521c at positions sandwiching the second portion 522 therebetween. Accordingly, unlike the above-mentioned embodiment, the first portion 521 is not configured to be disposed between a plurality of second portions.

As has been described above, according to the energy storage device of this modification, in the same manner as the above-mentioned embodiment, lowering of performance of the energy storage device can be suppressed while firmly joining the electrode assembly 400 and a current collector to each other. Particularly, according to this modification, the second portion 522 has only one second portion 522c and hence, the positive electrode current collector 501 can be easily manufactured.

Although this modification shows the configuration where two joined portions 20 are formed on one second portion 522c, the configuration may be adopted where three or more joined portions 20 are formed on one second portion 522c.

Modification 3

Next, a modification 3 of the above-mentioned embodiment is described. In the above-mentioned embodiment, in the positive electrode current collector 500, at least a portion (the terminal-side first portion 521a) of the first portion 521 is disposed between the terminal connecting portion 510 and the second portion (terminal-side second portion 522a).

However, in this modification, a first portion 521 is not disposed between a terminal connecting portion 510 and a second portion.

Figure 10:
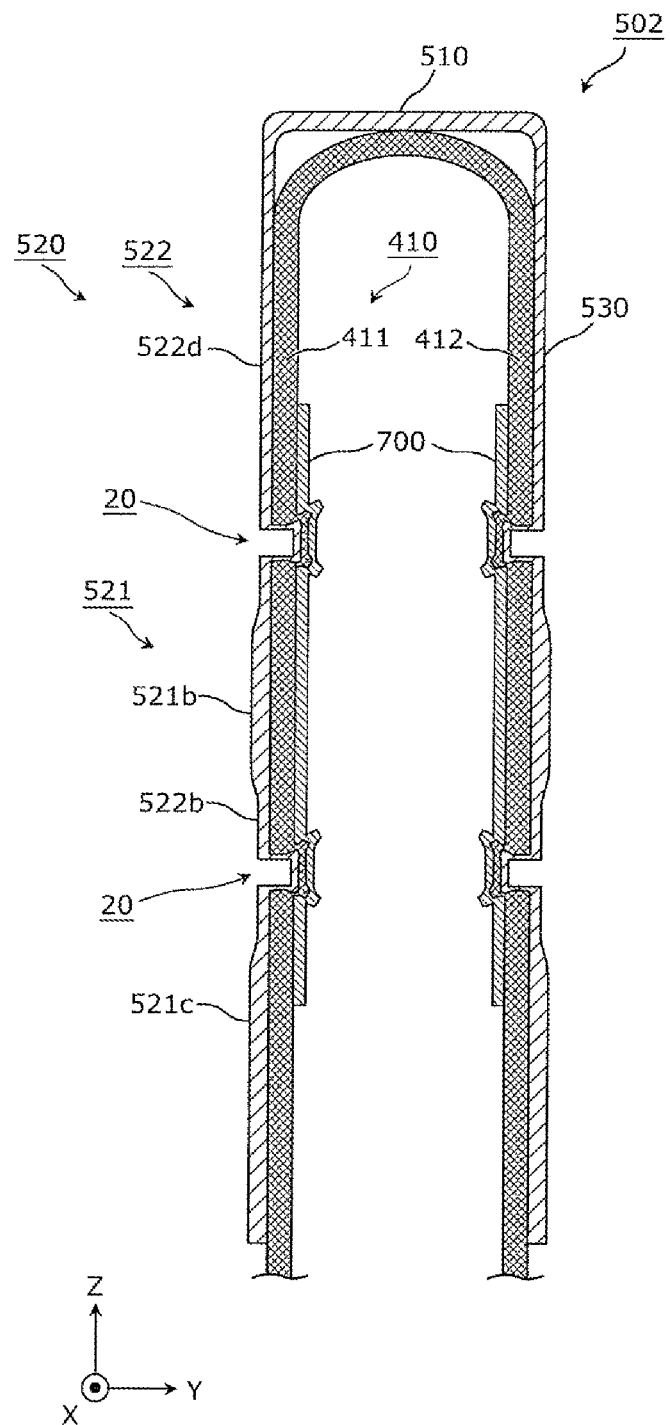
FIG. 10 is a cross-sectional view showing the configuration according to a modification 3 of the embodiment of the present invention where a positive electrode current collector is joined to a positive electrode converged portion of an electrode assembly.

FIG. 10 is a cross-sectional view showing the configuration where a positive electrode current collector 502 according to the third modification of the embodiment of the present invention is joined to a positive electrode converged portion 410 of an electrode assembly 400. To be more specific, FIG. 10 is a view corresponding to FIG. 5.

As shown in FIG. 10, the positive electrode current collector 502 of this embodiment has a terminal-side second portion 522d in place of the terminal-side first portion 521a and the terminal-side second portion 522a of the positive electrode current collector 500 of the above-mentioned embodiment. That is, the terminal-side first portion 521a of the above-mentioned embodiment is formed into a thin wall thickness portion, and is integrally formed with the terminal-side second portion 522a thus forming the terminal-side second portion 522d of this modification.

With such a configuration, a second portion 522 has the terminal-side second portion 522d which is connected to a terminal connecting portion 510, and the first portion 521 is configured such that the first portion 521 has an intermediate first portion 521b and a distal-end-side first portion 521c below the terminal-side second portion 522d. Accordingly, unlike the above-mentioned embodiment, the first portion 521 is not configured to be disposed between the terminal connecting portion 510 and the second portion 522.

As has been described above, according to the energy storage device of this modification, in the same manner as the above-mentioned embodiment, lowering of performance of the energy storage device can be suppressed while firmly joining the electrode assembly 400 and a current collector to each other. Particularly, according to this modification, a position of the thin wall thickness portion to be formed on the current collector can be set variously and hence, the degree of freedom in designing the current collector can be enhanced.

Modification 4

Next, a modification 4 of the above-mentioned embodiment is described. In the above-mentioned embodiment, in the positive electrode current collector 500, the first portions 521 are disposed at positions where the second portion 522 is sandwiched between the first portions 521 in the vertical direction. However, in this modification, a first portion 521 is disposed also on a periphery of a second portion 522.

Figure 11:
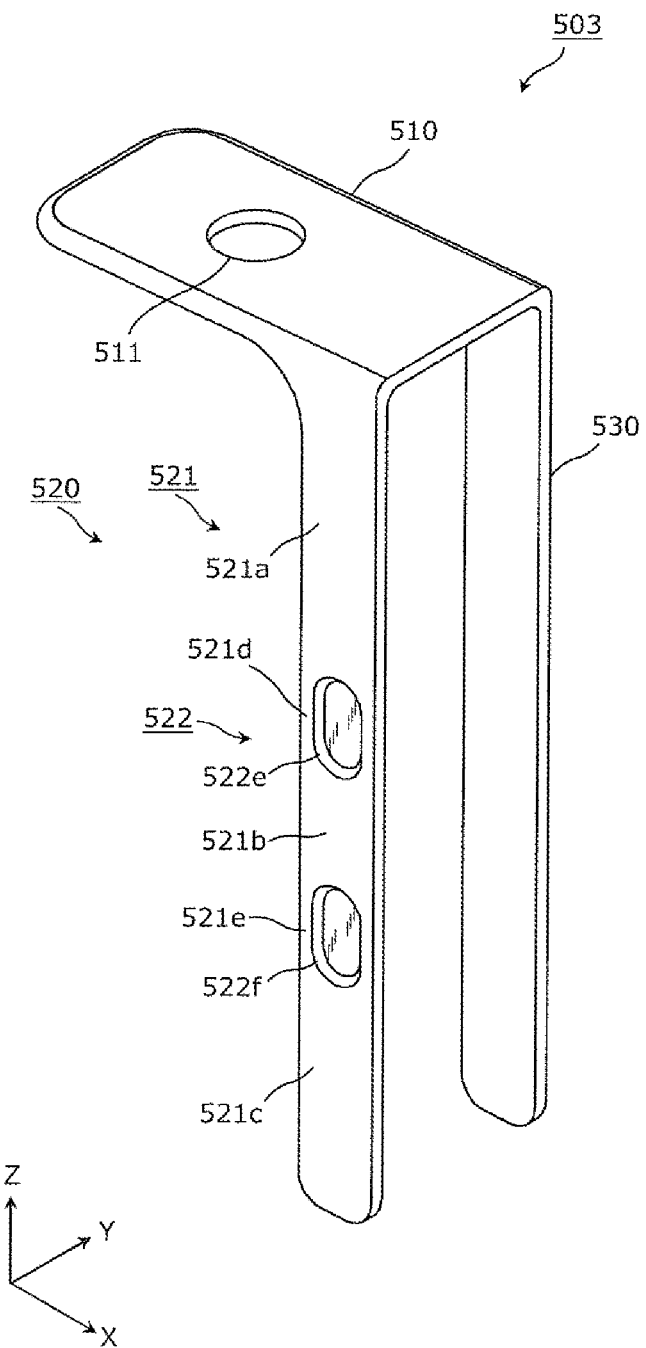
FIG. 11 is a perspective view showing the configuration of a positive electrode current collector according to a modification 4 of the embodiment of the present invention.

FIG. 11 is a perspective view showing a configuration of a positive electrode current collector 503 according to the modification 4 of the embodiment of the present invention. FIG. 11 is a view corresponding to FIG. 4, and shows the configuration of the positive electrode current collector 503 before the positive electrode current collector 503 is joined to an electrode assembly 400.

As shown in FIG. 11, the positive electrode current collector 503 of this modification has a terminal-side second portion 522e and a distal-end-side second portion 522f in place of the terminal-side second portion 522a and the distal-end-side second portion 522b of the positive electrode current collector 500 of the above-mentioned embodiment. Further, the positive electrode current collector 503 further has peripheral arranged first portions 521d, 521e around the terminal-side second portion 522e and the distal-end-side second portion 522f. That is, the terminal-side second portion 522a and the distal-end-side second portion 522b of the above-mentioned embodiment are respectively formed into a concave portion having an elongated circular shape, and the peripheral arranged first portions 521d, 521e of this modification are respectively formed on peripheries of the concave portions.

As described above, the positive electrode current collector 503 is configured as follows. Second portions 522 (the terminal-side second portion 522e and the distal-end-side second portion 522f) which are recessed portions each having an elongated circular shape are formed on an electrode connecting portion 520 as the thin wall thickness portion. The first portions 521 (a terminal-side first portion 521a, an intermediate first portion 521b, a distal-end-side first portion 521c, and the peripheral arranged first portions 521d, 521e) are disposed around the second portions 522 respectively. That is, the first portions 521 have the configuration where at least a portion of the first portion 121 is disposed on the periphery of the second portion 522. The same goes also for an electrode connecting portion 530.

In the same manner as the above-mentioned embodiment, a joined portion 20 is formed on the terminal-side second portion 522e and the distal-end-side second portion 522f of the second portion 522 respectively. Although the terminal-side second portion 522e and the distal-end-side second portion 522f are respectively formed into a recessed portion having an elongated circular shape in the drawing, the terminal-side second portion 522e and the distal-end-side second portion 522f may be a recessed portion having a circular shape, an elliptical shape, a rectangular shape or the like.

As described above, according to the energy storage device of this modification, in the same manner as the above-mentioned embodiment, lowering of performance of the energy storage device can be suppressed while firmly joining the electrode assembly 400 and a current collector to each other. Particularly, according to this modification, the portion having a large thickness is disposed around the second portion 522 having a small thickness and hence, a strength of the periphery of the second portion 522 can be ensured whereby lowering of performance of the energy storage device can be suppressed.

In this modification, the peripheral arranged first portions 521d, 521e are disposed so as to surround the whole circumferences of the terminal-side second portion 522e and the distal-end-side second portion 522f respectively. However, the configuration may be adopted where the peripheral arranged first portions 521d, 521e are formed only at portions of the whole circumferences of the terminal-side second portion 522e and the distal-end-side second portion 522f respectively.

Modification 5

Next, a modification 5 of the above-mentioned embodiment is described. In the above-mentioned embodiment, the second portion 522 of the positive electrode current collector 500 has the first convex portion projecting toward the electrode assembly 400 in the joined portion 20. However, in this modification, an electrode assembly 400 has a first convex portion projecting toward a second portion 522 in a joined portion.

Figure 12:
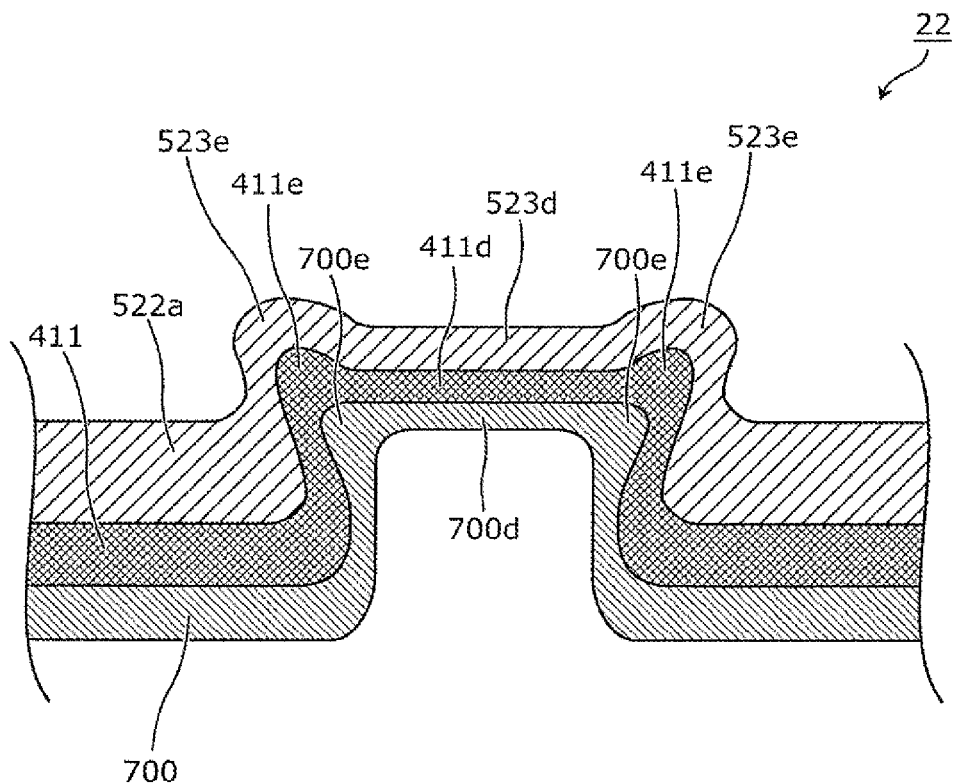
FIG. 12 is a cross-sectional view showing the configuration of a joined portion between a positive electrode current collector and an electrode assembly according to a modification 5 of the embodiment of the present invention.
Figure 12:
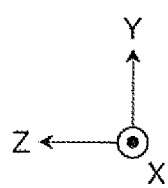

FIG. 12 is a cross-sectional view showing a configuration of a joined portion 22 between a positive electrode current collector and the electrode assembly 400 according to the modification 5 of the embodiment of the present invention. To be more specific, FIG. 12 is a view corresponding to FIG. 6.

As shown in FIG. 12, the second portion 522 of the positive electrode current collector, the electrode assembly 400, and a cover member 700 form first convex portions each projecting toward a second portion 522 side (in FIG. 12, toward a plus side in the Y axis direction) in the joined portion 22. Each first convex portion has a second convex portion which projects in a direction intersecting with a projecting direction of the first convex portion.

To be more specific, a terminal-side second portion 522a of the second portion 522 has a first current collector convex portion 523d which projects toward a side opposite to a flat converged portion 411 of the electrode assembly 400 in the joined portion 22. The flat converged portion 411 of the electrode assembly 400 has a first electrode assembly convex portion 411d which projects toward the terminal-side second portion 522a of the second portion 522 (toward a side opposite to the cover member 700) in the joined portion 22. Further, the cover member 700 has a first cover convex portion 700d which projects toward the terminal-side second portion 522a of the electrode assembly 400 in the joined portion 22.

The first current collector convex portion 523d has a second current collector convex portion 523e which projects in a direction intersecting with a projecting direction (Y axis direction) of the first current collector convex portion 523d. To be more specific, the second current collector convex portion 523e is formed so as to project in all directions perpendicular to the projecting direction of the first current collector convex portion 523d from a distal end of the first current collector convex portion 523d. Further, first electrode assembly convex portion 411d has a second electrode assembly convex portion 411e which projects in a direction intersecting with the projecting direction (Y axis direction) of the first electrode assembly convex portion 411d. To be more specific, the second electrode assembly convex portion 411e is formed so as to project in all directions perpendicular to the projecting direction of the first electrode assembly convex portion 411d from a distal end of the first electrode assembly convex portion 411d. The first cover convex portion 700d has a second cover convex portion 700e which projects in a direction intersecting with the projecting direction (Y axis direction) of the first cover convex portion 700d. To be more specific, the second cover convex portion 700e is formed so as to project in all directions perpendicular to the projecting direction of the first cover convex portion 700d from a distal end of the first cover convex portion 700d.

The projecting direction of the first convex portion and the projecting direction of the second convex portion are not limited to the above-mentioned directions, and may be directions inclined from the above-mentioned directions, and also the projecting shapes of the first and second convex portions are not limited to the above-mentioned projecting shape. The second convex portion may not be formed on the whole circumference of the distal end of the first convex portion, and may be formed on only a portion of the whole circumference of the second portion.

As described above, the configuration of this modification has the opposite relationship with respect to projecting direction of the first convex portion in the joined portion compared to the configuration of the above-mentioned embodiment. For example, when the second portion 522 of the positive electrode current collector is brought into contact with an inner side of the flat converged portion 411 of the electrode assembly 400 in this embodiment, the positional relationship between the second portion 522 and the cover member 700 becomes opposite to the positional relationship between the second portion 522 and the cover member 700 in the above-mentioned embodiment. In this case, the cover member 700 is disposed on an outer side. Accordingly, an object to be joined can be recessed from a cover member 700 side and hence, the joined portion 22 can be easily formed. By adopting such a modification, the positive electrode current collector and electrode assembly 400 can be easily joined to each other.

According to the energy storage device of this modification, in the same manner as the above-mentioned embodiment, lowering of performance of the energy storage device can be suppressed while firmly joining the electrode assembly 400 and the current collector to each other. Particularly, according to this modification, the electrode assembly 400 forms the first convex portion and the second convex portion, and these convex portions bite into the current collector and hence, the current collector and the electrode assembly 400 are firmly joined to each other. Accordingly, lowering of performance of the energy storage device can be suppressed while firmly joining the electrode assembly 400 and the current collector to each other.

In this modification, the cover member 700 is formed of a flat-plate-like member having a uniform thickness in a state before the cover member 700 is joined. However, also in this modification, as in the above-mentioned modification 1, a thin wall thickness portion may be formed on the cover member 700 at a position corresponding to the joined portion 22 before the cover member 700 is joined.

Although the energy storage devices according to the embodiment of the present invention and the modifications of the embodiment have been described heretofore, the present invention is not limited to the above-mentioned embodiment and the modifications of the embodiment. That is, it should be construed that the embodiment and the modifications of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment and the modifications (excluding the modification 2) of the embodiment, in the current collector, one joined portion is formed on one second portion. However, the number of joined portion is not limited, and a plurality of joined portions may be formed on one second portion. In this case, the current collector and the electrode assembly 400 can be further firmly joined to each other.

In the above-mentioned embodiment and the modifications of the embodiment, the second convex portion is formed on the first convex portion with respect to the current collector, the electrode assembly 400, and the cover member respectively. However, the configuration may be adopted where the second convex portion is not formed on at least one of the first convex portion of the current collector, the first convex portion of the electrode assembly 400, and the first convex portion of the cover member. Particularly, in the configuration where the second convex portion is not formed on the first convex portion of the cover member, after the electrode assembly 400 and the cover member are joined to each other, the electrode assembly 400 and the cover member which are joined to each other can be easily removed from a die of a joining tool. In this case, for making the electrode assembly 400 and the cover member which are joined to each other more easily removed from the die, the configuration may be adopted where an inclination angle of a side surface of the first convex portion of the cover member (an angle made by a side surface of the first convex portion and a surface on a proximal end side of the first convex portion, that is, for example, in FIG. 6, an angle made by surfaces of the first cover convex portion 700a on both sides in the Z axis direction and a surface of the cover member 700 on a plus side in the Y axis direction) is set to an obtuse angle. In other words, the configuration may be adopted where an outer diameter of the first convex portion of the cover member (that is, for example, in FIG. 6, a diameter of a cross section of the first cover convex portion 700a taken along the XZ plane) is gradually decreased as the first convex portion extends toward a distal end thereof (an end portion on a plus side in the Y axis direction).

In the above-mentioned embodiment and the modifications of the embodiment, the electrode current collector has the distal-end-side first portion 521c having a larger thickness than the second portion 522 in the electrode connecting portion 520. However, the distal-end-side first portion 521c may be formed with a thickness equal to or smaller than the thickness of the second portion 522, or the positive electrode current collector may not have the distal-end-side first portion 521c. However, it is preferable that the positive electrode current collector have the distal-end-side first portion 521c. This is because that the distal-end-side first portion 521c can be utilized in such a manner that warping of the electrode connecting portion 520 can be reduced at the time of manufacturing the positive electrode current collector by holding the distal-end-side first portion 521c. The same goes also for the electrode connecting portion 530 and the negative electrode current collector 600.

In the above-mentioned embodiment and the modifications of the embodiment, the positive electrode current collector is joined to the positive electrode converged portion 410 of the electrode assembly 400. However, the electrode assembly 400 may have a conductive member such as a lead or the like connected to the positive electrode converged portion 410, and the positive electrode current collector may be joined to the conductive member. In this case, the joined portion 20 is a joined portion between the second portion 522 of the electrode connecting portion 520 of the positive electrode current collector 500 and the conductive member, and either one of the second portion or the conductive member is configured to have a first convex portion which projects toward the other of the second portion or the conductive member in the joined portion. The same goes also for the negative electrode current collector 600.

In the above-mentioned embodiment and the modifications of the embodiment, the current collector, the electrode assembly 400 and the cover member are joined to each other. However, other members may be joined together with the current collector, the electrode assembly 400, and the cover member.

In the above-mentioned embodiment and the modifications of the embodiment, the current collector and the electrode assembly 400 are joined to each other only at the joined portions. However, besides joining at the joined portion, joining by another joining method may be performed. As another joining method, for example, ultrasonic welding, resistance welding, arc welding, welding by irradiation of a laser beam or an electron beam or the like can be named.

In the above-mentioned embodiment and the modifications of the embodiment, the energy storage device includes the cover member at the portion where the current collector and the electrode assembly 400 are joined to each other. The energy storage device may not include the cover member. However, from a viewpoint of ensuring a strength and the like, it is preferable that the energy storage device include the cover member.

In the above-mentioned embodiment and the modifications of the embodiment, for example, as shown in FIG. 6, in the joined portion 20, the positive electrode current collector, the electrode assembly 400, and the cover member are formed so as to project toward a plus side in the Y axis direction. However, a surface of the cover member on a plus side in the Y axis direction may be formed into a flat shape by press forming while maintaining a state where the first convex portion is formed on the second portion 522 and the electrode assembly 400 respectively.

In the above-mentioned embodiment and the modifications of the embodiment, the positive electrode current collector is configured such that the joined portion 20 is formed on the whole second portions 522 of the electrode connecting portion 520. However, the positive electrode current collector may be configured such that the joined portion 20 is not formed on some second portions 522. Further, the positive electrode current collector is configured such that the joined portions are formed on both the electrode connecting portions 520, 530. However, the positive electrode current collector may be configured such that the joined portions are formed on either one of the electrode connecting portions 520, 530. In the energy storage device, the joined portions are formed on both the positive electrode current collector and the negative electrode current collector respectively. However, the energy storage device may be configured such that the joined portions are formed on either one of the positive electrode current collector or the negative electrode current collector.

In the above-mentioned embodiment and the modifications of the embodiment, as an example of plastically deforming the current collector and the electrode assembly 400 at the time of joining the current collector and the electrode assembly 400 to each other, clinch joining is exemplified. However, the joining method is not limited to the clinch joining, and joining by swaging which differs from the clinch joining (a mode where only the first convex portion is formed by pressing or the like), joining using a rivet or the like may be adopted.

In the above-mentioned embodiment and the modifications of the embodiment, the electrode assembly 400 is a so-called vertical winding-type electrode assembly where a winding axis is parallel to the lid body 110. However, the electrode assembly 400 may be a so-called transverse winding-type electrode assembly where a winding axis is perpendicular to the lid body 110. In this case, tabs of an electrode assembly and thin wall thickness portions of current collectors are joined to each other, and either one of the thin wall thickness portion or the tab of the electrode assembly has a first convex portion which projects toward the other of the thin wall thickness portion and the tab of the electrode assembly in the joined portion.

Further, the configurations which are made by arbitrarily combining the constitutional elements included in the above-mentioned embodiment and the modifications of the embodiment are also included in the scope of the present invention. For example, the configuration of the modification 1 may be applied to the modifications 2 to 5, the configuration of the modification 2 may be applied to the modifications 3 to 5, the configuration of the modification 3 may be applied to the modifications 4, 5, or the configuration of the modification 4 may be applied to the modification 5.

The present invention can be realized not only in the form of such an energy storage device but also in the form of a current collector (a positive electrode current collector or a negative electrode current collector) which the energy storage device includes.

INDUSTRIAL APPLICABILITY

The present invention is applicable to an energy storage device and the like which can suppress lowering of performance of the energy storage device while firmly joining an electrode assembly and a current collector to each other.

DESCRIPTION OF REFERENCE SIGNS

10: energy storage device
20, 21, 22, 30: joined portion
100: container
110: lid body
110a, 110b: through hole
111: container body
200: positive electrode terminal
210, 310: projecting portion
300: negative electrode terminal
400: electrode assembly
410: positive electrode converged portion
411, 412: flat converged portion
411a, 411d: first electrode assembly convex portion
411b, 411e: second electrode assembly convex portion
420: negative electrode converged portion
500, 501, 502, 503: positive electrode current collector
510: terminal connecting portion
511, 611: opening portion
520, 530: electrode connecting portion
521: first portion
521a: terminal-side first portion
521b: intermediate first portion
521c: distal-end-side first portion
521d, 521e: peripheral arranged first portion
522, 522c: second portion
522a, 522d, 522e: terminal-side second portion
522b, 522f: distal-end-side second portion
523a, 523d: first current collector convex portion
523b, 523e: second current collector convex portion
600: negative electrode current collector
700, 710: cover member
700a, 700d: first cover convex portion
700b, 700e: second cover convex portion
711: first cover portion
712: second cover portion

The invention claimed is:

1. An energy storage device, comprising:
an electrode assembly which includes an electrode converged portion; and
a current collector,
wherein the electrode converged portion includes converged current collecting foils stacked in a stacking direction,
wherein the current collector includes an electrode connecting portion connected to the electrode converged portion,
wherein the electrode connecting portion includes a first portion and a second portion which has a smaller wall thickness than the first portion and is joined to the electrode assembly,
wherein one of the second portion and the electrode converged portion includes a first convex portion projecting toward another of the second portion and the electrode converged portion in a joined portion in the stacking direction, and
wherein the another of the second portion and the electrode converged portion includes a second convex portion that projects from the another of the second portion and the electrode converged portion away from the one of the second portion and the electrode converged portion in the stacking direction.

2. The energy storage device according to claim 1, wherein the current collector further includes a terminal connecting portion connected to an electrode terminal, and
wherein at least a portion of the first portion is disposed between the terminal connecting portion and the second portion.

3. The energy storage device according to claim 1, wherein the electrode connecting portion includes a plurality of the second portions, and
wherein at least a portion of the first portion is disposed between the plurality of the second portions.

4. The energy storage device according to claim 1, wherein at least a portion of the first portion is disposed on a periphery of the second portion.

5. The energy storage device according to claim 1, further comprising a cover member disposed at a position where the cover member sandwiches the electrode assembly in cooperation with the electrode connecting portion,
wherein the cover member includes a first cover portion and a second cover portion which has a smaller wall thickness than the first cover portion and is joined to the electrode assembly.

6. The energy storage device according to claim 1, further comprising a cover member disposed at a position where the cover member and the electrode connecting portion sandwich the electrode assembly.

7. The energy storage device according to claim 6, wherein the cover member is disposed on a surface of the electrode converged portion.

8. The energy storage device according to claim 6, wherein, in a projecting direction of the first convex portion toward said another of the second portion and the electrode assembly, the cover member is disposed on the surface of the electrode converged portion.

9. The energy storage device according to claim 8, wherein, in the projecting direction of the first convex portion toward said another of the second portion and the electrode assembly, the electrode connecting portion is disposed on another surface of the electrode converged portion.

10. The energy storage device according to claim 1, wherein the current collector further includes a terminal connecting portion connecting opposing sides of the first portion that are disposed on opposing sides of the electrode assembly, respectively.

11. The energy storage device according to claim 10, wherein the terminal connecting portion is disposed on a surface of the electrode converged portion that extends between the opposing sides of the electrode assembly.

12. The energy storage device according to claim 10, wherein the first portion is disposed between the second portion and the terminal connecting portion.

13. The energy storage device according to claim 1, wherein, in a longitudinal direction of an extension of the electrode connecting portion, the second portion is disposed between opposing sides of the first portion.

14. The energy storage device according to claim 13, wherein, in the longitudinal direction of the extension of the electrode connecting portion, the first convex portion is disposed between opposing sides of the second portion.

15. An energy storage device, comprising:
an electrode assembly including converged current collecting foils stacked in a stacking direction;
a current collector including an electrode connecting portion connected to the electrode assembly; and
a cover member disposed at a position where the cover member and the electrode connecting portion sandwich the electrode assembly,
wherein the electrode connecting portion includes a first portion and a second portion which has a smaller wall thickness than the first portion and is joined to the electrode assembly,
wherein one of the second portion and the electrode assembly includes a first convex portion projecting toward another of the second portion and the electrode assembly in a joined portion in the stacking direction,
wherein the another of the second portion and the electrode assembly includes a second convex portion that projects from the another of the second portion and the electrode assembly away from the one of the second portion and the electrode assembly in the stacking direction, and
wherein the cover member includes a first cover portion and a second cover portion which has a smaller wall thickness than the first cover portion and is joined to the electrode assembly.

16. The energy storage device according to claim 15, wherein, in a projecting direction of the first convex portion toward said another of the second portion and the electrode assembly, the cover member is disposed on a surface of the electrode assembly.

17. The energy storage device according to claim 16, wherein, in the projecting direction of the first convex portion toward said another of the second portion and the electrode assembly, the electrode connecting portion is disposed on another surface of the electrode assembly.

18. The energy storage device according to claim 15, wherein the current collector further includes a terminal connecting portion connecting opposing sides of the first portion that are disposed on opposing sides of the electrode assembly, respectively.

19. The energy storage device according to claim 15, wherein, in a longitudinal direction of an extension of the electrode connecting portion, the second portion is disposed between opposing sides of the first portion.

20. A method of manufacturing an energy storage device including an electrode assembly which includes an electrode converged portion, and a current collector including an electrode connecting portion connected to the electrode converged portion, the method comprising:
forming a thin wall thickness portion having a smaller wall thickness than another portion on the electrode connecting portion; and
joining the thin wall thickness portion and the electrode assembly to each other by plastic deformation,
wherein the electrode converged portion is formed by converging current collecting foils stacked in a stacking direction,
wherein one of the thin wall thickness portion and the electrode converged portion includes a first convex portion projecting toward another of the thin wall thickness portion and the electrode converged portion in a joined portion in the stacking direction, and
wherein the another of the thin wall thickness portion and the electrode converged portion includes a second convex portion that projects from the another of the thin wall thickness portion and the electrode converged portion away from the one of the thin wall thickness portion and the electrode converged portion in the stacking direction.

* * * * *